(12) United States Patent
Tanabe et al.

(10) Patent No.: US 12,551,314 B2
(45) Date of Patent: Feb. 17, 2026

(54) EXAMINATION MARKER

(71) Applicant: TOPPAN PRINTING CO., LTD., Tokyo (JP)

(72) Inventors: Junya Tanabe, Tokyo (JP); Ryohei Tode, Tokyo (JP); Saeko Nomura, Tokyo (JP); Tsukasa Yamazaki, Tokyo (JP); Ryo Shoda, Tokyo (JP); Hiroyoshi Nishiyama, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 779 days.

(21) Appl. No.: 17/196,565

(22) Filed: Mar. 9, 2021

(65) Prior Publication Data

US 2021/0186652 A1 Jun. 24, 2021

Related U.S. Application Data

(63) Continuation of application No. PCT/JP2019/037040, filed on Sep. 20, 2019.

(30) Foreign Application Priority Data

Sep. 20, 2018 (JP) .................. 2018-175817
Dec. 10, 2018 (JP) .................. 2018-230956
(Continued)

(51) Int. Cl.
*A61B 90/00* (2016.01)
*A61B 5/00* (2006.01)
(Continued)

(52) U.S. Cl.
CPC .............. *A61B 90/39* (2016.02); *A61B 5/004* (2013.01); *A61B 5/0507* (2013.01);
(Continued)

(58) Field of Classification Search
None
See application file for complete search history.

(56) References Cited

U.S. PATENT DOCUMENTS

| 4,193,404 A | 3/1980 | Repke et al. |
| 5,662,110 A | 9/1997 | Carr |

(Continued)

FOREIGN PATENT DOCUMENTS

| CN | 102159915 A | 8/2011 |
| CN | 107693839 A | 2/2018 |

(Continued)

OTHER PUBLICATIONS

Extended European Search Report issued in corresponding European Patent Application No. 19862669.9 dated Mar. 3, 2022.
(Continued)

*Primary Examiner* — Michael J Carey
*Assistant Examiner* — Marjan Saboktakin
(74) *Attorney, Agent, or Firm* — Foley & Lardner LLP

(57) ABSTRACT

An examination marker is used in diagnostic imaging using microwaves, including a marker body to be adhered to a site to be examined. The marker body is configured to display an index used for scanning of the site to be examined and to deform in accordance with a shape of the site to be examined, and the marker body has a transmittance of 70% or higher to microwaves at a frequency of 2 GHz.

2 Claims, 12 Drawing Sheets

(30) Foreign Application Priority Data

| Dec. 11, 2018 | (JP) | ................................ | 2018-231438 |
| Apr. 5, 2019 | (JP) | ................................ | 2019-072919 |
| Apr. 19, 2019 | (JP) | ................................ | 2019-079758 |
| Apr. 25, 2019 | (JP) | ................................ | 2019-084622 |

(51) Int. Cl.

| *A61B 5/0507* | (2021.01) |
| *C09J 7/20* | (2018.01) |
| *C09J 7/25* | (2018.01) |
| *C09J 7/29* | (2018.01) |
| *C09J 7/30* | (2018.01) |
| *C09J 7/38* | (2018.01) |

(52) U.S. Cl.
CPC ............... *A61B 5/4312* (2013.01); *C09J 7/20* (2018.01); *C09J 7/255* (2018.01); *C09J 7/29* (2018.01); *C09J 7/30* (2018.01); *C09J 7/38* (2018.01); *A61B 2090/3908* (2016.02); *A61B 2090/397* (2016.02); *A61B 2090/3991* (2016.02); *C09J 2203/334* (2013.01); *C09J 2301/312* (2020.08); *C09J 2467/006* (2013.01); *C09J 2475/006* (2013.01)

(56) References Cited

U.S. PATENT DOCUMENTS

| 5,983,124 | A | * | 11/1999 | Carr | ....................... A61B 5/015 600/407 |
| 6,063,029 | A | | 5/2000 | Saita et al. | |
| 6,086,247 | A | | 7/2000 | Von Hollen | |
| 6,356,621 | B1 | | 3/2002 | Furumori et al. | |
| 7,127,826 | B2 | | 10/2006 | Russell | |
| 7,781,041 | B2 | | 8/2010 | Broyles | |
| 9,276,324 | B2 | * | 3/2016 | Kelsey | .................. B32B 27/322 |
| 2005/0239369 | A1 | | 10/2005 | Clark | |
| 2009/0214852 | A1 | | 8/2009 | Kelsey et al. | |
| 2009/0263644 | A1 | | 10/2009 | Kelsey et al. | |
| 2010/0216905 | A1 | * | 8/2010 | Kuwamura | ........ C08G 18/6659 528/65 |
| 2011/0100547 | A1 | | 5/2011 | Kelsey et al. | |
| 2011/0223418 | A1 | | 9/2011 | Habassi | |
| 2012/0041432 | A1 | | 2/2012 | Spertell | |
| 2013/0180657 | A1 | | 7/2013 | Kelsey et al. | |
| 2013/0228186 | A1 | | 9/2013 | Ward | |
| 2014/0094678 | A1 | | 4/2014 | Traboulsi et al. | |
| 2015/0335288 | A1 | | 11/2015 | Toth et al. | |
| 2016/0022399 | A1 | | 1/2016 | St. Anne et al. | |
| 2016/0317057 | A1 | | 11/2016 | Li et al. | |
| 2018/0043144 | A1 | | 2/2018 | Sakuma et al. | |
| 2018/0078754 | A1 | | 3/2018 | Perez et al. | |
| 2018/0098820 | A1 | | 4/2018 | Park | |
| 2018/0116757 | A1 | | 5/2018 | Seto | |
| 2018/0214236 | A1 | | 8/2018 | Leiva | |
| 2018/0308259 | A1 | | 10/2018 | Kimura et al. | |
| 2019/0045745 | A1 | | 2/2019 | Inui et al. | |
| 2019/0110859 | A1 | * | 4/2019 | Baker | .................... A61B 90/39 |
| 2020/0101278 | A1 | | 4/2020 | Freeman et al. | |
| 2021/0186652 | A1 | | 6/2021 | Tanabe et al. | |
| 2021/0330417 | A1 | | 10/2021 | Tode et al. | |
| 2022/0319067 | A1 | | 10/2022 | Kimura et al. | |

FOREIGN PATENT DOCUMENTS

| DE | 10 2010 011 589 | A1 | | 9/2011 | | |
| EP | 0 800 788 | A1 | | 10/1997 | | |
| JP | H11-227390 | A | | 8/1999 | | |
| JP | 2000-160111 | A | | 6/2000 | | |
| JP | 2004252262 | A | * | 9/2004 | | |
| JP | 2004-347660 | A | | 12/2004 | | |
| JP | 2006-130865 | A | | 5/2006 | | |
| JP | 2010-018564 | A | | 1/2010 | | |
| JP | 2020-168348 | A | | 10/2020 | | |
| WO | WO-2006052951 | A1 | * | 5/2006 | ......... | A61F 13/0269 |
| WO | WO-2012/048020 | A1 | | 4/2012 | | |
| WO | WO-2015163129 | A1 | * | 10/2015 | .............. | B32B 3/28 |
| WO | WO-2017/057524 | A1 | | 4/2017 | | |
| WO | WO-2020/059861 | A1 | | 3/2020 | | |
| WO | WO-2020/145385 | A1 | | 7/2020 | | |

OTHER PUBLICATIONS

Partial Supplementary European Search Report dated Oct. 14, 2021 for corresponding European Patent Application No. 19862669.9, (14 pages).

Office Action issued in corresponding Japanese Patent Application No. 2019-084622, dated Aug. 23, 2022.

Office Action issued in corresponding Chinese Patent Application No. 201980060864.3 dated Oct. 28, 2023 (22 pages).

Office Action issued in corresponding Chinese Patent Application No. 201980060864.3 dated Apr. 30, 2024 (24 pages).

Office Action issued in corresponding Chinese Patent Application No. 201980060864.3 dated Aug. 22, 2024 (17 pages).

Plastic flexible packaging materials, "Polyurethane (PU)", Jul. 31, 2018, pp. 35-40.

"ASTM D3330/D3330M-04 Standard Test Method for Peel Adhesion of Pressure-Sensitive Tape" (2010). American Society for Testing and Materials. (Year: 2010).

"ASTM D6862-11 Standard Test Method for 90 Degree Peel Resistance of Adhesives" (2011). American Society for Testing and Materials. (Year: 2011).

"JIS K 7361-1: 1997 Plastic-transparent material test method for total light transmittance—Part 1: Single beam method" ( 1997) Japanese Industrial Standards. (Year: 1997).

"JIS Z 0237:2009 Test methods for adhesive tapes and sheets" (2009). Japanese Industrial Standards (Year: 2009).

"Major Industrial Polymers Polyester" (2017) Britannica.com (Year: 2017).

"Polyester" (2017) Britannica.com (Year: 2017).

"Polyethylene terephthalate Key Properties" (2008) Phoenix Technologies. Retrieved from WWW.phoenixtechnologies.net/media/371 /PET%20Properties%202008.pdf (Year: 2008).

European Extended Search Report issued in corresponding European Patent Application No. 22795912.9 dated Jun. 14, 2024.

Extended European Search Report issued in corresponding European Patent Application No. 20897575.5, dated Jan. 4, 2023.

International Searching Authority, "International Search Report," issued in connection with International Patent Application No. PCT/JP2020/045239, dated Mar. 2, 2021, 7 pages.

International Searching Authority, "International Search Report," issued in connection with International Patent Application No. PCT/JP2022/019435, dated Jul. 12, 2022.

International Searching Authority, "Written Opinion," issued in connection with International Patent Application No. PCT/JP2020/045239, dated Mar. 2, 2021, 4 pages.

International Searching Authority, "Written Opinion," issued in connection with International Patent Application No. PCT/JP2022/019435, dated Jul. 12, 2022.

Office Action issued in corresponding Chinese Patent Application No. 202080081126.X dated Oct. 27, 2024.

* cited by examiner

FIG.7

| | Material | Thickness (μm) | Intensity (mW/cm²) | Transmittance (%) |
|---|---|---|---|---|
| Test Example 1-1 | Al | 7 | 0.00 | 0 |
| Test Example 1-2 | Al | 14 | 0.00 | 0 |
| Test Example 1-3 | PVDF | 80 | 1.43 | 78 |
| Test Example 1-4 | PVDF | 160 | 1.39 | 75 |
| Test Example 1-5 | PVDF | 320 | 0.82 | 44 |
| Test Example 1-6 | EVA | 75 | 1.61 | 87 |
| Test Example 1-7 | EVA | 150 | 1.28 | 69 |
| Test Example 1-8 | EVA | 250 | 1.23 | 66 |
| Test Example 1-9 | PP | 40 | 1.54 | 84 |
| Test Example 1-10 | PP | 80 | 1.36 | 74 |
| Test Example 1-11 | PP | 120 | 1.12 | 61 |
| Test Example 1-12 | PU | 15 | 1.71 | 92 |
| Test Example 1-13 | PU | 30 | 1.67 | 91 |
| Test Example 1-14 | PU | 60 | 1.69 | 92 |
| Test Example 1-15 | PU | 90 | 1.37 | 74 |
| Test Example 1-16 | PU | 120 | 1.18 | 64 |
| Test Example 1-17 | PET | 12 | 1.70 | 92 |
| Test Example 1-18 | PET | 25 | 1.68 | 91 |
| Test Example 1-19 | PET | 75 | 1.46 | 79 |
| Test Example 1-20 | PET | 150 | 1.14 | 62 |
| Test Example 1-21 | Elastomer | 250 | 1.32 | 71 |

FIG.11

|  | Base film | | Tensile elongation at break (%) | Tensile strength at 100% elongation (N/cm) | Adhesion suitability Wrinkling |
| --- | --- | --- | --- | --- | --- |
|  | Material | Thickness (μm) | | | |
| Test Example 2-1 | PET | 12 | 65 | Broken | Poor |
| Test Example 2-2 | | 4.5 | 20 | Broken | Poor |
| Test Example 2-3 | EVA | 30 | 550 | 4.5 | Poor |
| Test Example 2-4 | | 15 | 520 | 2.9 | Fair |
| Test Example 2-5 | | 5 | 480 | 1.7 | Good |
| Test Example 2-6 | PU | 30 | 527 | 1.9 | Fair |
| Test Example 2-7 | | 15 | 650 | 1.0 | Good |
| Test Example 2-8 | | 5 | 442 | 0.6 | Good |
| Test Example 2-9 | PVA | 5 | 138 | 1.0 | Good |

FIG. 12

| No. | Base film | | | Adhesive layer | | Tensile elongation at break (%) | Tensile stress at 100% elongation (MPa) | Adhesion suitability | | | Water vapor transmission rate (g/m²·day) | Sweating test |
|---|---|---|---|---|---|---|---|---|---|---|---|---|
| | Material | Type of polyol | Thickness (μm) | Material | Thickness (μm) | | | Wrinkling | Lifting | Reworkability | | |
| Test Example 3-1 | PET | — | 12 | Acrylic | 20 | 85 | — | Poor | Good | Good | — | — |
| Test Example 3-2 | | | 4.5 | | | 20 | — | Poor | Good | Good | — | — |
| Test Example 3-3 | EVA | — | 30 | Acrylic | 20 | 550 | 18 | Poor | Good | Good | — | — |
| Test Example 3-4 | | | 15 | | | 520 | 14 | Poor | Good | Good | — | — |
| Test Example 3-5 | | | 5 | Urethane | | 480 | 10 | Good | Good | Good | 236 | Poor |
| Test Example 3-6 | | | | | | 480 | 10 | Good | Good | Good | 318 | Poor |
| Test Example 3-7 | PU | Ether | 30 | Acrylic | 20 | 500 | 9 | Fair | Good | Good | 445 | Poor |
| Test Example 3-8 | | | | | 10 | 500 | 9 | Fair | Good | Good | 469 | Poor |
| Test Example 3-9 | | | | | 5 | 490 | 9 | Fair | Fair | Good | 493 | Poor |
| Test Example 3-10 | | | | | 30 | 515 | 9 | Fair | Good | Good | 422 | Poor |
| Test Example 3-11 | | | | Urethane | 20 | 550 | 9 | Fair | Good | Good | 783 | Good |
| Test Example 3-12 | | | | | 10 | 540 | 8 | Fair | Fair | Good | 876 | Good |
| Test Example 3-13 | | | | | 5 | 540 | 9 | Fair | Fair | Good | 915 | Good |
| Test Example 3-14 | | | | | 30 | 580 | 9 | Fair | Good | Good | 693 | Poor |
| Test Example 3-15 | | | 15 | Acrylic | 20 | 660 | 7 | Good | Good | Good | 707 | Good |
| Test Example 3-16 | | | | Urethane | 20 | 640 | 7 | Good | Good | Good | 848 | Good |
| Test Example 3-17 | | | 5 | Acrylic | 20 | 440 | 4 | Good | Good | Fair | 681 | Poor |
| Test Example 3-18 | | | | | 10 | 425 | 5 | Good | Good | Fair | 711 | Poor |
| Test Example 3-19 | | | | | 5 | 420 | 4 | Good | Fair | Good | 742 | Poor |
| Test Example 3-20 | | | | | 30 | 455 | 4 | Good | Good | Poor | — | — |
| Test Example 3-21 | | | | Urethane | 20 | 460 | 5 | Good | Good | Fair | 872 | Good |
| Test Example 3-22 | | | | | 10 | 450 | 4 | Good | Good | Good | 980 | Good |
| Test Example 3-23 | | | | | 5 | 420 | 4 | Good | Fair | Good | 1037 | Good |
| Test Example 3-24 | | | | | 30 | 465 | 5 | Good | Good | Fair | 721 | Poor |
| Test Example 3-25 | PVA | — | 5 | Acrylic | 20 | 138 | 4 | Good | Good | Poor | 708 | Poor |

FIG. 13

| No. | Material | Base film Type of polyol | Thickness (μm) | Adhesive layer Material | Thickness (μm) | Tensile elongation at break (%) | Tensile stress at 100% elongation (MPa) | Adhesion suitability Wrinkling | Lifting | Reworkability | Water vapor transmission rate (g/m²·day) | Sweating test |
|---|---|---|---|---|---|---|---|---|---|---|---|---|
| Test Example 3-26 | PU | Ester | 15 | Urethane | 20 | 420 | 2 | Good | Good | Good | 721 | Poor |
| Test Example 3-27 | PU | Ester | 15 | Urethane | 10 | 425 | 2 | Good | Good | Good | 769 | Good |
| Test Example 3-28 | PU | Ester | 5 | Urethane | 20 | 415 | 2 | Good | Good | Fair | 822 | Good |
| Test Example 3-29 | PU | Ester | 5 | Urethane | 10 | 415 | 2 | Good | Good | Fair | 857 | Good |
| Test Example 3-30 | PU | Ether | 15 | Urethane | 20 | 525 | 2 | Good | Good | Good | 824 | Good |
| Test Example 3-31 | PU | Ether | 15 | Urethane | 10 | 510 | 2 | Good | Good | Good | 862 | Good |
| Test Example 3-32 | PU | Ether | 5 | Urethane | 20 | 500 | 2 | Good | Good | Fair | 938 | Good |
| Test Example 3-33 | PU | Ether | 5 | Urethane | 10 | 505 | 2 | Good | Good | Fair | 1016 | Good |
| Test Example 3-34 | PU | Carbonate | 15 | Urethane | 20 | 360 | 3 | Fair | Good | Good | 693 | Poor |
| Test Example 3-35 | PU | Carbonate | 15 | Urethane | 10 | 345 | 3 | Fair | Good | Good | 752 | Good |
| Test Example 3-36 | PU | Carbonate | 5 | Urethane | 20 | 325 | 3 | Good | Good | Good | 788 | Good |
| Test Example 3-37 | PU | Carbonate | 5 | Urethane | 10 | 310 | 3 | Good | Good | Good | 831 | Good |

FIG.17

| No. | Base film | Separable film | Dynamic friction coefficient | Peel strength N/25mm |
|---|---|---|---|---|
| | Arithmetic average roughness Ra (μm) | Arithmetic average roughness Ra (μm) | | |
| Test Example 4-1 | 0.07 | 0.08 | 3.52 | 0.06 |
| Test Example 4-2 | 0.2 | 0.3 | 2.06 | 0.06 |
| Test Example 4-3 | 0.4 | 0.5 | 2.56 | 0.10 |
| Test Example 4-4 | 1.2 | 1.5 | 2.33 | 0.12 |
| Test Example 4-5 | 1.4 | | 1.22 | 0.22 |
| Test Example 4-6 | 1.3 | | 2.23 | 0.15 |
| Test Example 4-7 | 5.0 | 7.0 | 1.45 | 0.45 |

FIG. 18

| | Adhesive layer | | | Base film | | | Water vapor transmission rate (g/m²·day) | Lifting | Wrinkling | Sweating | Adhesive residue | Tearing |
|---|---|---|---|---|---|---|---|---|---|---|---|---|
| | Material | Thickness (μm) | Isocyanate groups/Hydroxyl groups | Thickness (μm) | Breaking strength (N/25mm) | Peel strength (N/25mm) | | | | | | |
| Test Example 5-1 | Urethane | 10 | 0.13 | 8 | 6.3 | 2.1 | 1023 | Good | Good | Excellent | Good | Good |
| Test Example 5-2 | Urethane | 10 | 0.19 | 8 | 6.3 | 1.7 | 990 | Good | Good | Excellent | Good | Good |
| Test Example 5-3 | Urethane | 20 | 0.13 | 8 | 6.3 | 1.9 | 863 | Good | Good | Excellent | Good | Good |
| Test Example 5-4 | Urethane | 20 | 0.19 | 8 | 6.3 | 1.6 | 891 | Good | Good | Excellent | Good | Good |
| Test Example 5-5 | Urethane | 15 | 0.13 | 10 | 6.7 | 3.2 | 924 | Good | Good | Excellent | Good | Excellent |
| Test Example 5-6 | Urethane | 15 | 0.13 | 15 | 10.4 | 3.5 | 886 | Good | Good | Excellent | Good | Excellent |
| Test Example 5-7 | Urethane | 20 | 0.03 | 15 | 10.4 | 4.4 | 891 | Good | Good | Excellent | Good | Excellent |
| Test Example 5-8 | Acrylic | 10 | 0.15 | 8 | 6.4 | 5.4 | 799 | Good | Good | Good | Good | Good |
| Test Example 5-9 | Urethane | 10 | 0.25 | 8 | 6.3 | 0.8 | 988 | Poor | Good | Excellent | Good | Good |
| Test Example 5-10 | Urethane | 10 | 0.13 | 30 | 59.6 | 1.2 | 755 | Poor | Poor | Good | Good | Good |
| Test Example 5-11 | Acrylic | 20 | 0.13 | 8 | 6.3 | 5.4 | 638 | Good | Good | Poor | Good | Good |
| Test Example 5-12 | Urethane | 20 | 0.01 | 15 | 10.4 | 7.2 | 834 | Good | Good | Good | Poor | Good |
| Test Example 5-13 | Urethane | 10 | 0.13 | 5 | 2.5 | — | 914 | Good | Poor | Excellent | Good | Poor |

FIG. 19

| | Glass transition temperature (°C) | Mass ratio | Tensile elongation at break (%) | Tensile stress at 100% elongation (MPa) | Adhesion suitability | Peel strength (N/25mm) | Handling suitability |
|---|---|---|---|---|---|---|---|
| Test Example 6-1 | 40 | — | 520 | 2.2 | Good | 3.6 | Poor |
| Test Example 6-2 | 40 / 90 | 25 / 1 | 520 | 3.4 | Good | 2.2 | Fair |
| Test Example 6-3 | 40 / 90 | 12.5 / 1 | 470 | 4.0 | Good | 1.6 | Fair |
| Test Example 6-4 | 40 / 90 | 10 / 1 | 440 | 4.2 | Good | 1.4 | Fair |
| Test Example 6-5 | 40 / 90 | 5 / 1 | 450 | 5.8 | Fair | 0.9 | Fair |
| Test Example 6-6 | 40 / 90 | 2 / 1 | 440 | 10.1 | Poor | 0.3 | Good |
| Test Example 6-7 | 40 / 90 | 1 / 1 | 450 | 10.8 | Poor | 0 | Good |
| Test Example 6-8 | 40 / 90 | 1 / 5 | 370 | 12.3 | Poor | 0 | Good |
| Test Example 6-9 | 40 / 90 | 1 / 10 | 330 | 14.6 | Poor | 0 | Good |

EXAMINATION MARKER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/037040, filed on Sep. 20, 2019, which is based upon and claims the benefit of priority to Japanese Patent Application No. 2018-175817, filed on Sep. 20, 2018; Japanese Patent Application No. 2018-230956, filed on Dec. 10, 2018; Japanese Patent Application No. 2018-231438, filed on Dec. 11, 2018; Japanese Patent Application No. 2019-072919, filed on Apr. 5, 2019; Japanese Patent Application No. 2019-079758, filed on Apr. 19, 2018; Japanese Patent Application No. 2019-084622, filed on Apr. 25, 2019, the disclosures of which are incorporated herein by reference in their entireties.

TECHNICAL FIELD

The present invention relates to an examination marker for use in diagnostic imaging using microwaves.

BACKGROUND ART

As a method for examining breast cancer, microwave mammography has been proposed (for example, see PTL 1). In microwave mammography, since the breast as a site to be examined does not need to be compressed, a subject does not feel pain during the examination. Furthermore, in microwave mammography, which does not use X-rays, a subject is not exposed to X-ray radiation.

CITATION LIST

Patent Literature

PTL 1: WO-2017/057524-A1

SUMMARY OF THE INVENTION

Technical Problem

In microwave mammography, the breast is scanned with a probe to generate a three-dimensional image. Then, the three-dimensional image thus generated is used to diagnose whether the subject suffers from breast cancer. In order to generate more accurate three-dimensional images of the subject's breast, it is required to scan a predetermined distance in each scan with a probe, and scan the breast without missing or duplicating scans. However, since the scan with a probe is manually performed by the operator, the scanned distances may vary depending on the operator, and scans may be missed or duplicated. As a result, the accuracy of three-dimensional images and thus the accuracy in diagnostic imaging are lowered.

The above problem is not limited to microwave mammography, and may also occur in microwave diagnostic imaging of other examination sites.

The present invention aims to provide an examination marker for improved diagnostic imaging.

Solution to Problem

An examination marker for solving the above problem is used for diagnostic imaging using microwaves, and includes a marker body to be adhered to a site to be examined. The marker body is configured to display an index used for scans of the site to be examined and to deform in accordance with a shape of the site to be examined, and the marker body has a transmittance of 70% or higher to microwaves having a frequency of 2 GHz.

According to the above configuration, an operator can be prompted to perform a scan according to the index displayed on the marker body. Accordingly, the site to be examined can be scanned with high accuracy. Further, since the marker body has a transmittance of 70% or higher to microwaves having a frequency of 2 GHz, the microwaves emitted from a probe can be prevented from being attenuated. Accordingly, the accuracy of scanned images increases, and thus the accuracy of diagnostic imaging increases.

An examination marker for solving the above problem is an examination marker for use in diagnostic imaging using microwaves. The examination marker includes a base film for adhesion to a site to be examined, and the base film has a scan index. The base film has a tensile elongation at break of 130% or more, and a tensile strength at 100% elongation of 4 N/cm or less.

According to the above configuration, an operator can be prompted to perform a scan according to the index displayed on the marker body. Accordingly, the site to be examined can be scanned with high accuracy.

BRIEF DESCRIPTION OF THE DRAWINGS

FIG. 7 is a table showing measurement results of Test Examples in the first embodiment.

FIG. 11 is a table showing measurement results and evaluation results of Test Examples in the second embodiment.

FIG. 12 is a table showing measurement results and evaluation results of Test Examples in a third embodiment.

FIG. 13 is a table showing measurement results and evaluation results of Test Examples in the third embodiment.

FIG. 17 is a table showing measurement results of Test Examples in the fourth embodiment.

FIG. 18 is a table showing measurement results and evaluation results of Test Examples in a fifth embodiment.

FIG. 19 is a table showing measurement results and evaluation results of Test Examples in a sixth embodiment.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Embodiment

With reference to FIGS. 1 to 7, a first embodiment of an examination marker will be described. In the following description, an examination marker, usage of the examination marker, and test examples are each described. The examination marker in the present embodiment is a marker for use in mammography, which is an example of diagnostic imaging using microwaves. The examination marker is a marker to be adhered to the breast, which is a site examined in mammography.

[Examination Marker]

Figure 1:
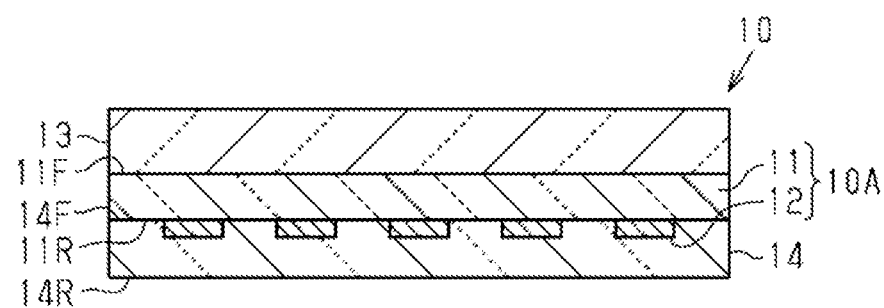
FIG. 1 is a cross-sectional view illustrating a structure of a first example of an examination marker according to a first embodiment.
Figure 2:
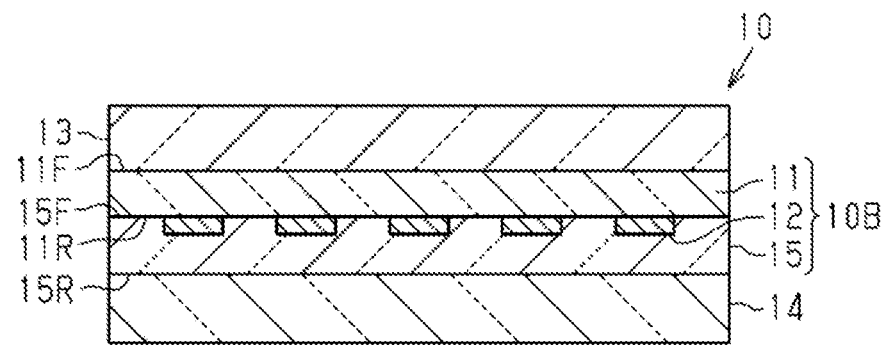
FIG. 2 is a cross-sectional view illustrating a structure of a second example of an examination marker according to the first embodiment.
Figure 3:
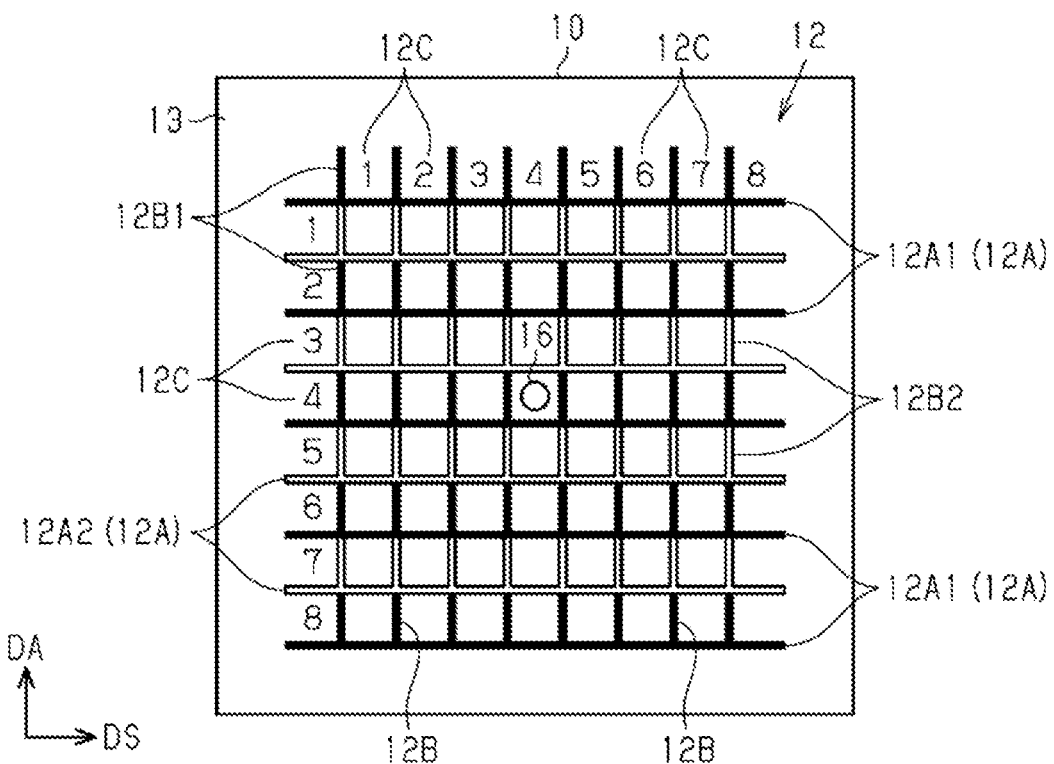
FIG. 3 is a plan view illustrating a structure of an examination marker as viewed in a direction perpendicular to a surface of the examination marker.

With reference to FIGS. 1 to 3, an examination marker will be described.

The examination marker includes a marker body. The marker body is configured to display an index used for a breast scan and deform in accordance with the shape of the breast. The marker body is adhered to the breast. The marker body has a transmittance of 70% or higher to microwaves having a frequency of 2 GHz. In the following description, a configuration of a first example of the examination marker will be described with reference to FIG. 1, and a second example of the examination marker will be described with reference to FIG. 2. Then, a configuration common to the first and second examples of the examination marker will be described with reference to FIG. 3.

As shown in FIG. 1, the first example of an examination marker 10 includes a base film 11 as an example marker body 10A. The base film 11 is provided with a coordinate grid 12 used for guiding a scan position in a site to be examined. The coordinate grid 12 is an example scan index. The base film 11 has a transmittance of 70% or higher to microwaves at 2 GHz.

Transmittance T to microwaves is calculated by the following formula:

Transmittance $T$=(measurement intensity $\mu_m$/reference intensity $\mu_0$)×100

The reference intensity $\mu_0$ refers to an intensity (mW/cm$^2$) of microwaves measured in a state in which a transmitter that emits 2 GHz microwaves is in contact with a microwave receiver. The measurement intensity $\mu_m$ refers to an intensity (mW/cm$^2$) of microwaves measured in a state in which the marker body 10A is sandwiched between the transmitter and receiver which are the same as those used in measuring the reference intensity $\mu_0$.

The examination marker 10 can prompt an operator such as a doctor or imaging technologist to perform a scan according to the index displayed on the marker body 10A. Accordingly, a breast scan can be performed with high accuracy. In addition, since the marker body 10A has a transmittance of 70% or higher to microwaves at 2 GHz, the microwaves emitted from a probe can be prevented from being attenuated. Accordingly, the accuracy of scanned images increases, and thus the accuracy of diagnostic imaging increases.

Since the marker body 10A has the coordinate grid 12, processing or a device for displaying the index is not necessary. In addition, the operator can scan with a probe along the coordinate grid 12. Accordingly, a distance that the operator scans the probe can be constant.

The marker body 10A includes a portion having a total light transmittance according to JIS K 7361-1:1997 of 30% or more. Accordingly, it is possible to recognize the state on a surface of the breast through a portion of the marker body 10A having a total light transmittance of 30% or more. In the present embodiment, a portion of the marker body 10A other than the coordinate grid 12 is a transmitting portion, which has a total light transmittance of 30% or more. Accordingly, positions of moles and spots on the breast can be specified through the transmitting portion by visual observation or observation with a camera. Since the positions of moles and spots on the breast are unchanged, they have importance in identifying the position of a lesion in the breast.

The base film 11 is made of a synthetic resin. The synthetic resin for forming the base film 11 may be, for example, a polyurethane resin. Accordingly, the base film 11 having high adhesion suitability and high water vapor transmission rate can be provided. The base film 11 may have a thickness of, for example, 5 μm or more and 30 μm or less. The base film 11 made of polyurethane resin and having a small thickness is easily stretched when a small amount of external force is applied to the base film 11. Therefore, the base film 11 has high conformability to the shape of the breast and high adhesion to the breast.

The base film 11 can be made of any synthetic resin other than polyurethane resin as long as it has a transmittance of 70% or higher to microwaves at 2 GHz. Examples of the synthetic resin other than polyurethane resin include polyvinylidene fluoride resin, ethylene-vinyl acetate copolymer resin, polypropylene resin, and polyethylene terephthalate resin.

The base film 11 has a front surface 11F and a rear surface 11R as a pair of surfaces facing away from each other. The front surface 11F is a surface scanned with a probe during the examination of a site to be examined. In the present embodiment, the coordinate grid 12 is provided on the rear surface 11R.

The examination marker 10 further includes a separable film 13 and a protective film 14. The separable film 13 is detachably laminated on the front surface 11F of the base film 11. The protective film 14 is detachably laminated on the rear surface 11R of the base film 11.

The protective film 14 covers the rear surface 11R of the base film. Accordingly, the coordinate grid 12 is sandwiched between the base film 11 and the protective film 14 such that the coordinate grid 12 is not exposed to the outer surface of the examination marker 10. Therefore, the coordinate grid 12 is not likely to be detached from the base film 11. When viewed in a direction in which the protective film 14 overlaps the base film 11, that is, in a direction perpendicular to the base film 11, the protective film 14 covers the entire surface of the base film 11. A surface of the protective film 14 in contact with the base film 11 is a front surface 14F, and a surface facing away from the front surface 14F is a rear surface 14R. The protective film 14 covers the entire surface of the coordinate grid 12, and has a thickness sufficient to make the rear surface 14R substantially flat.

The rear surface 11R of the base film 11 in the examination marker 10 is a surface to be adhered to a subject. In the examination marker 10, the base film 11 is sandwiched between the separable film 13 and the protective film 14 in the thickness direction of the base film 11. Accordingly, the base film 11 is protected from the outside by the separable film 13 and the protective film 14 until immediately before the base film 11 is adhered to the subject. Therefore, the base film 11 is kept clean until it is adhered to the subject.

The separable film 13 and the protective film 14 are preferably made of a transparent or translucent synthetic resin film. For example, the separable film 13 and the protective film 14 include a substrate film and a release layer. The release layer is laminated on the substrate film. The release layer of the separable film 13 is in contact with the front surface 11F of the base film 11. Further, the release layer of the protective film 14 is in contact with the rear surface 11R of the base film 11. The substrate film may be, for example, a polyethylene terephthalate film. The release layer may be, for example, a silicone resin layer. Alternatively, the separable film 13 and the protective film 14 may also include only a substrate film, and a surface of the substrate film that is in contact with another layer may be subjected to processing that improves releasability.

In a part of the separable film 13, a half-cut may be formed. In other words, the separable film 13 may have a notch extending from a front surface of the separable film 13 to the middle of the separable film 13 in the thickness direction. The front surface is a surface of the separable film 13 on a side opposite to that in contact with the base film 11.

As shown in FIG. 2, the second example of the examination marker 10 includes an adhesive layer 15 in addition to the base film 11, the separable film 13, and the protective film 14. In the second example of the examination marker 10, the marker body 10B includes the base film 11 and the adhesive layer 15. The adhesive layer 15 is laminated on the base film 11. The adhesive layer 15 is adhered to the breast. In the marker body 10B, a layer having a function of displaying the index and a layer having a function of adhering to a site to be examined are different from each other. Accordingly, compared to a case where one layer has a function of displaying the index and a function of adhering to a site to be examined, the degree of freedom in the material for forming an examination marker can be increased.

The adhesive layer 15 covers the rear surface 11R of the base film. Accordingly, since the coordinate grid 12 is sandwiched between the base film 11 and the adhesive layer 15, the coordinate grid 12 does not form the outer surface of the examination marker 10. Therefore, the coordinate grid 12 is not likely to be detached from the base film 11. When viewed in a direction in which the adhesive layer 15 overlaps the base film 11, the adhesive layer 15 covers the entire surface of the base film 11. A surface of the adhesive layer 15 in contact with the base film 11 is a front surface 15F, and a surface facing away from the front surface 15F is a rear surface 15R. The front surface 15F of the adhesive layer 15 is in contact with the base film 11, and the rear surface 15R of the adhesive layer 15 is in contact with the protective film 14.

The adhesive layer 15 covers the entire surface of the coordinate grid 12, and has a thickness sufficient to make the rear surface 15R substantially flat. The rear surface 15R of the adhesive layer 15 in the examination marker 10 is a surface to be adhered to a subject.

The marker body 10B is sandwiched between the separable film 13 and the protective film 14 in the thickness direction of the base film 11. Accordingly, the marker body 10B is protected from the outside by the separable film 13 and the protective film 14 until immediately before the marker body 10B is adhered to the subject. Therefore, the marker body 10B is kept clean until it is adhered to the subject. The adhesive layer 15 may have a thickness of, for example, 5 µm or more and 25 µm or less.

Similarly to the base film 11, the adhesive layer 15 is made of a synthetic resin. The synthetic resin for forming the adhesive layer 15 may be, for example, a polyurethane resin. The adhesive layer 15 made of a polyurethane resin can be provided with high water vapor transmission rate. In the marker body 10B, the adhesive layer 15 can be made of any synthetic resin other than polyurethane resin as long as it has a transmittance of 70% or higher to microwaves at 2 GHz.

With reference to FIG. 3, the coordinate grid 12 will be more specifically described below.

As shown in FIG. 3, the coordinate grid 12 includes a plurality of grid lines 12A. The plurality of grid lines 12A each extend in a scan direction DS and are arranged side by side in an array direction DA, which is perpendicular to the scan direction DS. In the present embodiment, the left-right direction of the drawing sheet is the scanning direction DS. The scan direction DS is the direction in which the operator scans the site to be examined by using a probe. Further, in the present embodiment, the array direction DA is a direction extending between the top and bottom of the drawing sheet. In the array direction DA, first grid lines 12A1 having a first color and second grid lines 12A2 having a second color are alternately arranged. The second color is different from the first color.

When the operator scans with the probe in the scan direction DS, scans along the first grid lines 12A1 and scans along the second grid lines 12A2 can be alternately performed. This prevents the operator from scanning the same grid line 12A a plurality of times, or missing a scan of a certain grid line 12A. That is, according to the grid lines 12A, scanning errors by the operator can be reduced.

For example, the first grid lines 12A1 may be red, and the second grid lines 12A2 may be blue. The first color as the color of the first grid lines 12A1 and the second color as the color of the second grid lines 12A2 are not limited to red and blue, and may be other colors as long as they are different from each other.

The coordinate grid 12 further includes a plurality of grid lines 12B each extending in the array direction DA. The plurality of grid lines 12B are arranged side by side in the scan direction DS. When viewed in a direction perpendicular to a plane parallel to the examination marker 10, the plurality of grid lines 12B together with the above plurality of grid lines 12A form a square grid. In the grid lines 12B, first sections 12B1 and second sections 12B2 are alternately arranged. The first sections 12B1 and the second sections 12B2 are alternately defined between each of the first grid lines 12A1 and each of the second grid lines 12A2 adjacent to each other in the array direction DA. The first section 12B1 has the first color which is the same as the first grid line 12A1. The second section 12B2 has the second color which is the same as the second grid line 12A2.

The coordinate grid 12 further includes position marks 12C. In the present embodiment, the position marks 12C are numbers used to specify the positions on the coordinate grid 12. The position marks 12C include, for example, a plurality of numbers arranged in the scan direction DS. The plurality of numbers are located outside the uppermost first grid line 12A1 in the array direction DA. Each number is located between two grid lines 12B or outside the outermost grid line 12B in the scan direction DS. The position marks 12C include, for example, a plurality of numbers arranged in the array direction DA. The plurality of numbers are located outside the leftmost grid line 12B in the scan direction DS. Each number is located between two grid lines 12A in the array direction DA. The position marks 12C are not limited to a plurality of numbers and may also include, for example, a plurality of characters.

Since the coordinate grid 12 includes the position marks 12C, the accuracy in the examination may be further improved as the operator refers to the position marks 12C. Further, when a lesion is found in the breast, the position marks 12C can be used to identify the position of the lesion in the breast.

The coordinate grid 12 is printed with ink on the rear surface 11R of the base film 11. Ink for printing the coordinate grid 12 can be any ink that can be printed on the base film 11.

The examination marker 10 further includes a mark 16 that indicates a predetermined position in the coordinate grid 12. In the present embodiment, the predetermined position is a center of the coordinate grid 12. The mark 16 is a circular point located at the center of the coordinate grid 12. The shape of the mark 16 is not limited to a circular shape, and may also be any shape. Further, a plurality of portions spaced from each other may also be provided as the marks 16. Moreover, the mark 16 may also be provided at a position deviated from the center of the coordinate grid 12 as long as it indicates the center of the coordinate grid 12. As with the coordinate grid 12, the mark 16 may be printed with ink on the rear surface 11R of the base film 11.

According to the mark 16, in use of the examination marker 10, specific coordinates indicated by the mark 16 can be superimposed on a specific position of the breast. In the present embodiment, a subject can adhere the examination marker 10 to the breast while positioning the mark 16 on the nipple so that the coordinate grid 12 covers the entire breast around the nipple. Accordingly, the operator can scan the entire breast around the nipple in the circumferential direction.

[Usage of Examination Marker]

Figure 4:
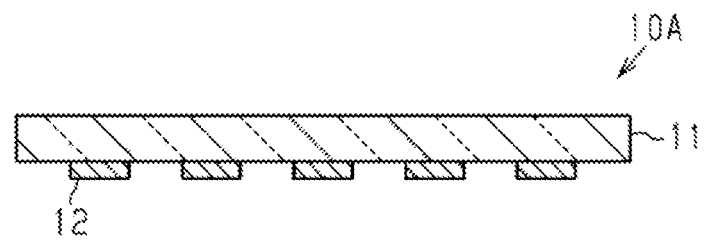
FIG. 4 is a cross-sectional view illustrating a structure of a marker body when an examination marker of the first example is used.
Figure 5:
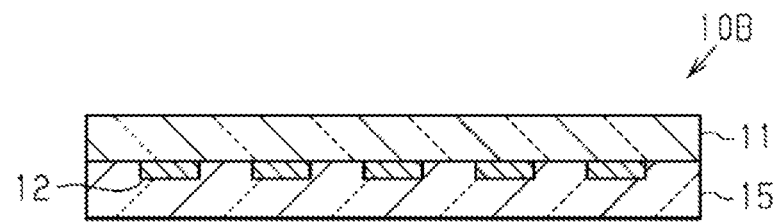
FIG. 5 is a cross-sectional view illustrating a structure of a marker body when an examination marker of the second example is used.
Figure 6:
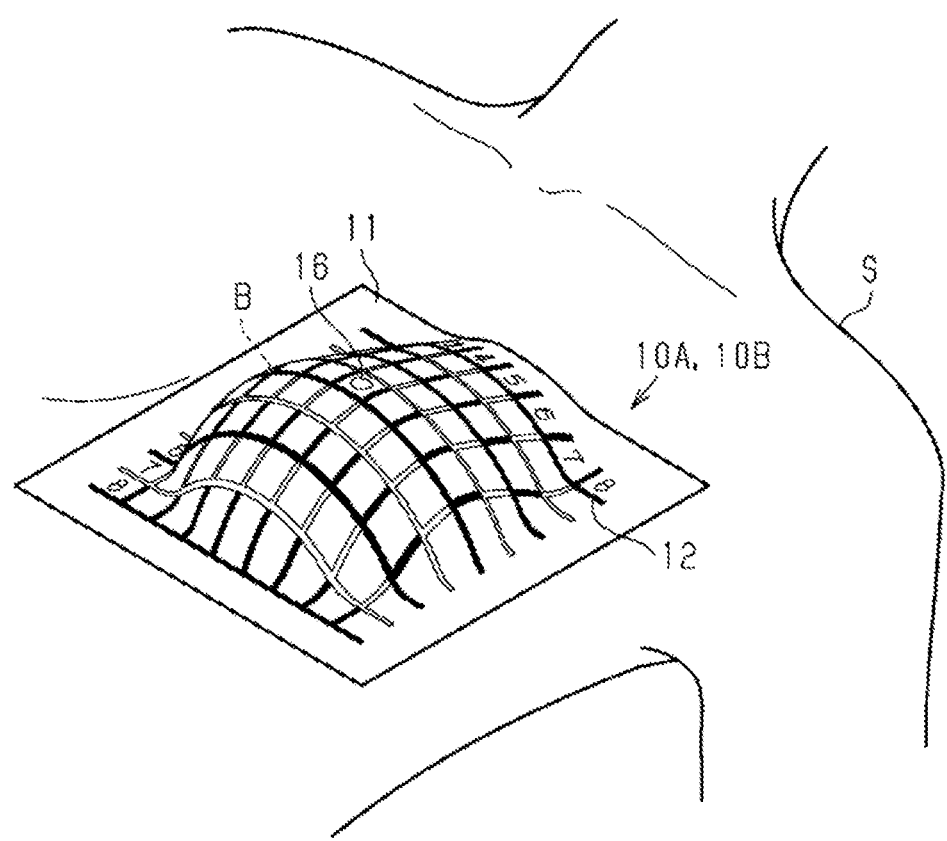
FIG. 6 is a schematic view illustrating usage of an examination marker.

With reference to FIGS. 4 to 6, usage of the examination marker 10 will be described. Usage of the first example of the examination marker 10 will be described with reference to FIG. 4, and usage of the second example of the examination marker 10 will be described with reference to FIG. 5.

As shown in FIG. 4, in use of the first example of the examination marker 10, the user first removes the separable film 13 and the protective film 14 from the base film 11. In use of the first example of the examination marker 10, the separable film 13 may be removed earlier than the protective film 14, or the protective film 14 may be removed earlier than the separable film 13.

Further, as shown in FIG. 5, in use of the second example of the examination marker 10, the user removes the separable film 13 from the base film 11, and removes the protective film 14 from the adhesive layer 15. As with the case of the first example of the examination marker 10, the separable film 13 may be removed earlier than the protective film 14, or the protective film 14 may be removed earlier than the separable film 13.

As shown in FIG. 6, the marker body 10A or 10B is adhered to a breast B of a subject S. At this time, the examination marker 10 is adhered to the breast B while the mark 16 of the examination marker 10 is superimposed on the nipple. In the present embodiment, the mark 16 is positioned at the center of the coordinate grid 12. Accordingly, as the mark 16 is superimposed on the nipple, respective portions of the coordinate grid 12 can be positioned around the nipple across the entire breast in the circumferential direction. Thus, the coordinate grid 12 can be used as a guide to facilitate scanning of the entire breast B.

When the marker body 10A or 10B is adhered to the breast B, the position of the mark 16 is aligned with the nipple while four sides of the laminate are stretched outward. Then, the laminate is gradually adhered to the breast B from the upper end toward the lower end of the marker body 10A or 10B. This prevents wrinkling in the base film 11. The upper end of the marker body 10A or 10B is a side located superior to the nipple, and the lower side is a side located inferior to the nipple. When wrinkling occurred in the base film 11, a portion of the marker body 10A or 10B having creasing in the base film 11 is removed from the breast B, and then the marker body 10A or 10B is adhered to the breast B while a force stretching the edge of the base film 11 outward is applied to the marker body 10A or 10B. Thus, wrinkling occurred in the base film 11 can be removed.

When the marker body 10A or 10B is adhered to the breast B, a tool for stretching the edge of the marker body 10A or 10B outward may also be used. In addition, when a half-cut is formed in the separable film 13 as described above, the marker body 10A or 10B may also be adhered to the breast B in the following procedure. That is, after the protective film 14 is removed from the marker body 10A or 10B, a laminate composed of the separable film 13 and the marker body 10A or 10B is adhered to the breast B. Then, the separable film 13 may be removed from the base film 11.

As described above, in the present embodiment, the grid lines 12A extending in the scan direction DS include the first grid lines 12A1 and the second grid lines 12A2 having different colors, and the first grid lines 12A1 and the second grid lines 12A2 are alternately arranged in the array direction DA. Accordingly, when the operator scans with the probe in the scan direction DS, scans along the first grid lines 12A1 and scans along the second grid lines 12A2 can be alternately performed. This prevents the operator from scanning the same grid line 12A a plurality of times, or missing a scan of a certain grid line 12A. That is, according to the grid lines 12A, scanning errors by the operator can be reduced.

TEST EXAMPLES

With reference to FIG. 7, test examples will be described.

Test Example 1-1

A 7-µm thick aluminum foil (manufactured by UACJ Corporation, 1N30) was prepared as an examination marker of Test Example 1-1.

Test Example 1-2

Two sheets of the aluminum foil used in Test Example 1-1 were stacked on each other to prepare a 14-µm thick aluminum foil as an examination marker of Test Example 1-2.

Test Example 1-3

A polyvinylidene fluoride resin (manufactured by Arkema Inc., Kynar FLEX2500) (Kynar is a registered trademark) was subjected to extrusion molding to form an 80-µm thick polyvinylidene fluoride resin (PVDF) film as a marker body. Thus, an examination marker of Test Example 1-3 was prepared.

Test Example 1-4

Two PVDF films formed by the same molding method as in Test Example 1-3 were stacked on each other to form a 160-µm thick PVDF film. Thus, an examination marker of Test Example 1-4 was prepared.

Test Example 1-5

Four PVDF films formed by the same molding method as in Test Example 1-3 were stacked on each other to form a 320-µm thick PVDF film. Thus, an examination marker of Test Example 1-5 was prepared.

Test Example 1-6

A 75-µm thick ethylene-vinyl acetate copolymer resin (EVA) film (manufactured by Tatsuno Chemical Industries, Inc, MIDEA) (MIDEA is a registered trademark) was prepared as an examination marker of Test Example 1-6.

Test Example 1-7

Two EVA films used in Test Example 1-6 were stacked on each other to form a 150-µm thick EVA film. Thus, an examination marker of Test Example 1-7 was prepared.

Test Example 1-8

A 250-µm thick EVA film (manufactured by Tatsuno Chemical Industries, Inc, MIDEA) was prepared as an examination marker of Test Example 1-8.

Test Example 1-9

A 40-µm thick biaxially oriented polypropylene resin (OPP) film (manufactured by Futamura Chemical Co., Ltd., FOR-MP) was prepared as an examination marker of Test Example 1-9.

Test Example 1-10

Two OPP films used in Test Example 1-9 were stacked on each other to form an 80-µm thick OPP film. Thus, an examination marker of Test Example 1-10 was prepared.

Test Example 1-11

Three OPP films used in Test Example 1-9 were stacked on each other to form a 120-µm thick OPP film. Thus, an examination marker of Test Example 1-11 was prepared.

Test Example 1-12

An aqueous urethane resin (manufactured by Mitsui Chemicals, Inc., TAKELAC WS-6021) (TAKELAC is a registered trademark) was subjected to melt-casting film formation to form a 15-µm thick polyurethane (PU) film. Thus, an examination marker of Test Example 1-12 was prepared.

Test Example 1-13

Two PU films formed by the same film formation method as in Test Example 1-12 were stacked on each other to form a 30-µm thick PU film. Thus, an examination marker of Test Example 1-13 was prepared.

Test Example 1-14

Four PU films formed by the same film formation method as in Test Example 1-12 were stacked on each other to form a 60-µm thick PU film. Thus, an examination marker of Test Example 1-14 was prepared.

Test Example 1-15

Six PU films formed by the same film formation method as in Test Example 1-12 were stacked on each other to form a 90-µm thick PU film. Thus, an examination marker of Test Example 1-15 was prepared.

Test Example 1-16

Eight PU films formed by the same film formation method as in Test Example 1-12 were stacked on each other to form a 120-µm thick PU film. Thus, an examination marker of Test Example 1-16 was prepared.

Test Example 1-17

A 12-µm thick polyethylene terephthalate resin (PET) film (manufactured by Toray Industries, Inc., Lumirror S10) (Lumirror is a registered trademark) was prepared as an examination marker of Test Example 1-17.

Test Example 1-18

A 25-µm thick PET film (manufactured by Toray Industries, Inc., Lumirror S10) was prepared as an examination marker of Test Example 1-18.

Test Example 1-19

A 75-µm thick PET film (manufactured by Toray Industries, Inc., Lumirror S10) was prepared as an examination marker of Test Example 1-19.

Test Example 1-20

Two PET films used in Test Example 1-19 were stacked on each other to form a 150-µm thick PET film. Thus, an examination marker of Test Example 1-20 was prepared.

Test Example 1-21

A 250-µm thick elastomer mesh film (manufactured by Meiwa Gravure Co., Ltd.) was prepared as an inspection seal of Test Example 1-21.
[Evaluation Method]
[Measurement of Reference Intensity $\mu_0$]

A transmitter that emits microwaves at 2 GHz and a receiver that receives microwaves (manufactured by MK Scientific, Inc., DT-2G) were prepared. While the transmitter was in contact with a receiving unit of the receiver, the intensity of the microwaves was measured for 30 seconds. A maximum value during the 30-second measurement period was taken as an intensity of the microwave. The same measurement was performed three times, and an average of the microwave intensities was calculated as a reference intensity $\mu_0$. The reference intensity $\mu_0$ was 1.85 mW/cm$^2$.
[Measurement of Measurement Intensity $\mu_m$]

While the entire receiver (the same as above) was wrapped with the examination marker of each test example, the transmitter was in contact with a receiving unit of the receiver to measure a measurement intensity $\mu_m$ for each test example. The measurement intensity $\mu_m$ was measured in the same manner as for the reference intensity $\mu_0$.
[Evaluation Results]

FIG. 7 shows the measurement results of the measurement intensity $\mu_m$ for the examination marker of each test example.
[Evaluation Results]

As shown in FIG. 7, the measurement intensity $\mu_m$ of Test Example 1-1 was 0.00 mW/cm2, the measurement intensity $\mu_m$ of Test Example 1-2 was 0.00 mW/cm$^2$, and the measurement intensity $\mu_m$ of Test Example 1-3 was 1.43 mW/cm$^2$. Further, the measurement intensity $\mu_m$ of Test Example 1-4 was 1.39 mW/cm$^2$, the measurement intensity $\mu_m$ of Test Example 1-5 was 0.82 mW/cm$^2$, and the measurement intensity $\mu_m$ of Test Example 1-6 was 1.61 mW/cm$^2$. Further, the measurement intensity $\mu_m$ of Test Example 1-7 was 1.28 mW/cm$^2$, the measurement intensity $\mu_m$ of Test Example 1-8 was 1.23 mW/cm$^2$, and the measurement intensity $\mu_m$ of Test Example 1-9 was 1.54 mW/cm$^2$.

In addition, the measurement intensity $\mu_m$ of Test Example 1-10 was 1.36 mW/cm$^2$, the measurement intensity $\mu_m$ of Test Example 1-11 was 1.12 mW/cm$^2$, and the measurement intensity $\mu_m$ of Test Example 1-12 was 1.71 mW/cm$^2$. Further, the measurement intensity $\mu_m$ of Test Example 1-13 was 1.67 mW/cm$^2$, the measurement intensity $\mu_m$ of Test Example 1-14 was 1.69 mW/cm$^2$, and the measurement intensity $\mu_m$ of Test Example 1-15 was 1.37 mW/cm$^2$. Further, the measurement intensity $\mu_m$ of Test Example 1-16 was 1.18 mW/cm$^2$, the measurement intensity $\mu_m$ of Test Example 1-17 was 1.70 mW/cm$^2$, and the measurement intensity $\mu_m$ of Test Example 1-18 was 1.68 mW/cm$^2$. Further, the measurement intensity $\mu_m$ of Test Example 1-19 was 1.48 mW/cm2, the measurement intensity $\mu_m$ of Test Example 1-20 was 1.14 mW/cm$^2$, and the measurement intensity $\mu_m$ of Test Example 1-21 was 1.32 mW/cm$^2$.

FIG. 7 shows the microwave transmittance in each test example based on the reference intensity $\mu_0$ and the measurement intensity $\mu_m$ in each test example. That is, as shown in FIG. 7, the transmittance of Test Example 1-1 was 0%, the transmittance of Test Example 1-2 was 0%, and the transmittance of Test Example 1-3 was 78%. Further, the transmittance of Test Example 1-4 was 75%, the transmittance of Test Example 1-5 was 44%, and the transmittance of Test Example 1-6 was 87%. Further, the transmittance of Test Example 1-7 was 69%, the transmittance of Test Example 1-8 was 66%, and the transmittance of Test Example 1-9 was 84%.

In addition, the transmittance of Test Example 1-10 was 74%, the transmittance of Test Example 1-11 was 61%, and the transmittance of Test Example 1-12 was 92%. Further, the transmittance of Test Example 1-13 was 91%, the transmittance of Test Example 1-14 was 92%, and the transmittance of Test Example 1-15 was 74%. Further, the transmittance of Test Example 1-16 was 64%, the transmittance of Test Example 1-17 was 92%, and the transmittance of Test Example 1-18 was 91%. Further, the transmittance of Test Example 1-19 was 79%, the transmittance of Test Example 1-20 was 62%, and the transmittance of Test Example 1-21 was 71%.

A breast scan using a probe was performed via the examination marker of each test example, and whether a three-dimensional image capable of diagnosing the breast could be generated was determined. The examination markers of Test Example 1-3, Test Example 1-4, Test Example 1-6, Test Example 1-9, Test Example 1-10, Test Examples 1-12 to 1-15, Test Examples 1-17 to 1-19, and Test Example 1-21 were able to generate a three-dimensional image when adhered to the subject. On the other hand, the examination markers of Test Example 1-1, Test Example 1-2, Test Example 1-5, Test Example 1-7, Test Example 1-8, Test Example 1-11, Test Example 1-16, and Test Example 1-20 caused attenuation of microwaves in the examination marker when adhered to the subject, and the transmittance was insufficient to generate a three-dimensional image.

Thus, it was found that the examination marker provided with the marker body having a transmittance of 70% or higher to microwaves was able to generate a three-dimensional image that can be used for diagnosis of the breast.

As described above, according to the first embodiment of the examination marker, the following advantages can be obtained.

(1-1) Since an operator can be prompted to perform a scan according to the index displayed on the marker body 10A or 10B, the site to be examined can be scanned with high accuracy. Further, since the marker body 10A or 10B has a transmittance of 70% or higher to microwaves having a frequency of 2 GHz, attenuation of the microwaves emitted from the probe can be prevented. Accordingly, the accuracy of scanned images increases, and thus the accuracy of diagnostic imaging increases.

(1-2) It is possible to recognize the state on a surface of the breast B through a portion of the marker body 10A or 10B having a total light transmittance of 30% or more.

(1-3) Since the marker body 10A or 10B has the coordinate grid 12, processing or a device for displaying the index on the marker body 10A or 10B is not necessary.

(1-4) According to the grid lines 12A, scanning errors by the operator can be reduced.

(1-5) In use of the examination marker 10, specific coordinates indicated by the mark 16 can be superimposed on a specific position in the breast B.

(1-6) When the marker body 10B includes the base film 11 and the adhesive layer 15, a layer having a function of displaying the index and a layer having a function of adhering to the breast B are different from each other. Accordingly, compared to a case where one layer has a function of displaying the index and a function of adhering to the breast B, the degree of freedom in the material for forming an examination marker can be increased.

[Modifications of First Embodiment]

The first embodiment described above can be implemented with the following modifications.

[Marker Body]

A portion of the marker body 10A or 10B other than the coordinate grid 12 may also have a total light transmittance of less than 30%. In this case as well, advantages similar to the above (1-1) can be obtained as long as the marker body 10A or 10B has a microwave transmittance of 70% or more. Further, the coordinate grid 12 may have a total light transmittance of 30% or more. In this case, it is possible to recognize the state on a surface of the breast B through the coordinate grid 12.

The marker body 10A or 10B may not necessarily include the index such as the coordinate grid 12. In this case, the marker body 10A or 10B may display the index with a projection apparatus projecting various images onto the marker body 10A or 10B. In this case as well, advantages similar to the above (1-1) can be obtained.

The marker body 10A or 10B may have a shape other than a rectangle shape. The marker body 10A or 10B may have, for example, a geometric shape such as elliptical, circular, and triangular shapes, or an irregular shape other than the geometric shape.

The marker body may have a multilayer structure composed of three or more layers. In this case as well, advantages similar to the above (1-1) can be obtained as long as the marker body can display the index, and the marker body has a transmittance of 70% or higher to microwaves at 2 GHz.

[Coordinate Grid]

All the grid lines 12A may have the same color. In this case as well, the grid lines 12A can guide the probe to a direction to be scanned.

The coordinate grid 12 may also have a shape other than a square grid. For example, the coordinate grid 12 may also have a shape corresponding to a polar coordinates system, which includes a plurality of concentric circles having different diameters.

The coordinate grid 12 may not necessarily include the grid lines 12B. As long as the coordinate grid 12 has at least the grid lines 12A, scanning errors by the operator can be reduced. That is, the scan index provided on the base film 11 is not limited to the coordinate grid 12, and may have other shape such as the shape extending in one direction. The scan index may have a shape capable of, for example, guiding a probe to a position to be scanned or a direction to be scanned.

The coordinate grid 12 may not necessarily include the position mark 12C. As long as the coordinate grid 12 has at least the grid lines 12A, scanning errors by the operator can be reduced.

The index provided on the marker body 10A or 10B is not limited to the coordinate grid 12, and may also be a scan index having a pattern extending in one direction or may be indices represented by numbers or characters. The index may have a shape capable of, for example, indicating a position or a direction to be scanned with a probe.

The coordinate grid 12 may not necessarily be formed by printing. For example, the coordinate grid 12 may be formed of recesses or projections provided on the base film 11.

[Mark]

The mark 16 may be omitted. In this case as well, as long as the marker body 10A or 10B includes the coordinate grid 12, the relative position of the coordinate grid 12 to the breast B can be adjusted when the marker body 10A or 10B is adhered to the breast B so that the entire breast around the nipple in the circumferential direction can be scanned.

Similarly to the coordinate grid 12, the mark 16 may not necessarily be formed by printing. For example, the mark 16 may be formed of recesses or projections provided on the base film 11.

[Base Film]

The base film 11 may have a thickness of larger than 30 μm, or smaller than 5 μm. In this case as well, advantages similar to the above (1-1) can be obtained as long as the marker body 10A or 10B has a microwave transmittance of 70% or more.

The marker body 10A, that is, the base film 11 may be adhered to the breast by using, for example, an adhesive member having adhesion suitability. The adhesive member may be a tape, for example. In this case, a region of the base film 11 outside the scan index is adhered to the breast via the adhesive member. The adhesive member may be located on the rear surface 11R of the base film 11, or may be located on the front surface 11F of the base film 11. When the adhesive member is located on the front surface 11F of the base film, the adhesive member may have a shape and a size extending from the base film 11 to the outside the base film 11.

The marker body may include the base film 11 and an attachment layer to be laminated on the base film 11. In this case, the base film 11 and the attachment layer are separate members, and the attachment layer is laminated on the base film 11 when the marker body is used. The attachment layer may be a layer that can be attached to the breast to thereby position the base film 11 on the breast. The attachment layer may be, for example, an adhesive layer made of the additive described above. Alternatively, the attachment layer may be, for example, a layer made of aliphatic hydrocarbon in the form of an ointment. That is, the attachment layer may be, for example, a layer made of aliphatic hydrocarbon in the form of a cream. In this case as well, advantages similar to the above (1-1) can be obtained as long as the marker body can display the scan index, and the marker body has a transmittance of 70% or higher to microwaves.

[Adhesive Layer]

The adhesive for forming the adhesive layer 15 may be an adhesive other than urethane-based adhesives. For example, the adhesive for forming the adhesive layer 15 may be an acrylic adhesive.

[Separable Film]

In the examination marker 10, the separable film 13 may be omitted. In this case as well, advantages similar to the above (1-1) can be obtained as long as the marker body 10A or 10B can display the scan index, and the marker body 10A or 10B has a transmittance of 70% or higher to microwaves.

[Protective Film]

In the examination marker 10, the protective film 14 may be omitted. In this case as well, advantages similar to the above (1-1) can be obtained as long as the marker body 10A or 10B can display the scan index, and the marker body 10A or 10B has a transmittance of 70% or higher to microwaves.

[Site to be Examined]

The site to be examined is not limited to the breast, and may be other positions in the subject body. That is, the examination marker 10 may also be used for diagnostic imaging other than mammography.

Second Embodiment

With reference to FIGS. 1, 4, and 8 to 11, a second embodiment of an examination marker will be described. In the second embodiment, components common to those in the first embodiment are denoted by the same reference signs as in the first embodiment, and detailed description thereof will be omitted. In the following description, an examination marker, usage of the examination marker, and test examples are each described.

[Examination Marker]

Figure 8:
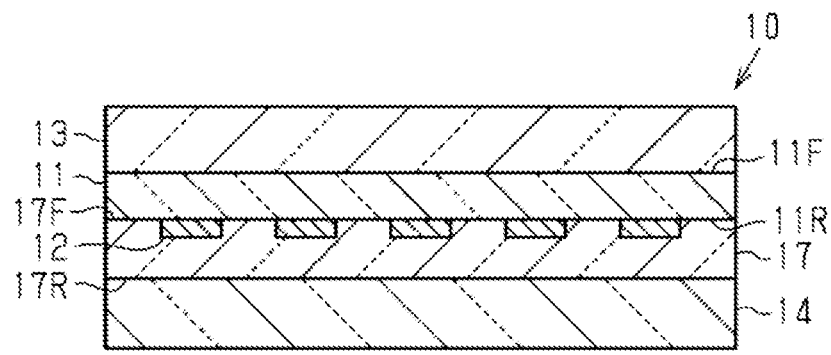
FIG. 8 is a cross-sectional view illustrating a structure of a fourth example of an examination marker according to a second embodiment.

With reference to FIGS. 1 and 8, an examination marker will be described. In the following description, a configuration of a third example of the examination marker will be described with reference to FIG. 1, and a fourth example of the examination marker will be described with reference to FIG. 8.

As with the examination marker of the first embodiment, the examination marker in the present embodiment is a marker for use in mammography, which is an example of diagnostic imaging using microwaves. The examination marker is a marker to be adhered to the breast, which is a site examined in mammography.

The third example of the examination marker 10 has the same structure as that of the first example of the examination marker 10 in the first embodiment, which was described earlier with reference to FIG. 1. The base film 11 of the present embodiment satisfies two conditions described below.

(Condition 2-1) The tensile elongation at break is 130% or more.

(Condition 2-2) The tensile strength at 100% elongation is 4 N/cm or less.

The examination marker 10 has a tensile elongation at break and a tensile strength at 100% elongation suitable for adhesion to a site to be examined. Accordingly, the examination marker 10 can be easily adhered to a site to be examined.

The tensile elongation at break can be calculated in accordance with JIS K 7161-1:2014 (ISO 527-1) and JIS K 7127:1999 (ISO 527-3). The tensile elongation at break can be calculated by using a tensile strain at break when an object to be measured does not have a yield point, and a nominal tensile strain at break when an object to be measured has a yield point.

The tensile strength at 100% elongation is a value obtained by dividing the magnitude of the force measured when the strain defined in JIS K 7161-1:2014 (ISO 527-1) reaches a predetermined value (100%) by the width of the test piece. The tensile strength at 100% elongation (T) (N/cm) can be calculated by the following formula.

$$T=F/W$$

where F is a magnitude (N) of the measured force, and W is the width (cm) of the test piece.

The polyurethane resin for forming the base film 11 includes at least one selected from the group consisting of ether-based polyurethane resin, ester-based polyurethane resin, and carbonate-based polyurethane resin. Accordingly, a base film 11 having high adhesion suitability and high moisture permeability can be provided.

The ether-based polyurethane resin is a polyurethane resin produced using an ether-based polyol containing an ether bond (—O—). The ester-based polyurethane resin is a polyurethane resin produced using an ester-based polyol containing an ester bond (—COO—). The carbonate-based polyurethane resin is a polyurethane resin produced using a polyol containing a carbonate bond (—OC(=O)O—). The base film 11 may have a thickness of, for example, 5 μm or more and 30 μm or less.

The base film 11 has a pair of surfaces facing away from each other. The pair of surfaces facing away from each other are composed of the front surface 11F and the rear surface 11R. In the present embodiment, the coordinate grid 12 is provided on the rear surface 11R. The base film 11 is transparent or translucent. A portion of the base film 11 other than the coordinate grid 12 preferably has a total light transmittance according to JIS K 7361-1 of 50% or more.

As with the examination marker 10 of the first embodiment, the examination marker 10 further includes the separable film 13 and the protective film 14. The separable film 13 is detachably laminated on the front surface 11F of the base film 11. The protective film 14 is detachably laminated on the rear surface 11R of the base film 11. A portion of the examination marker 10 other than the coordinate grid 12 preferably has a total light transmittance according to JIS K 7361-1 of 30% or more, and more preferably 50% or more.

The protective film 14 is transparent or translucent. The protective film 14 preferably has a total light transmittance of 30% or more, and more preferably 50% or more.

As shown in FIG. 8, the fourth example of the examination marker 10 further includes a gel layer 17 in addition to the base film 11, the separable film 13, and the protective film 14. The gel layer 17 is made of an aliphatic hydrocarbon that has a higher transmissivity to microwaves than water does. The gel layer 17, which is provided on the base film 11, has viscosity that enables adhesion of the base film 11 to the breast. That is, the gel layer 17 has a microwave transmittance higher than that of water. Due to the examination marker 10 provided with the gel layer 17, it is not required to apply a drug to a site to be examined to adhere the base film 11 to the breast. Accordingly, the base film 11 can be easily adhered to the breast.

The gel layer 17 is made of an aliphatic hydrocarbon in the form of an ointment. In the present embodiment, the gel layer 17 covers the rear surface 11R of the base film 11. Accordingly, since the coordinate grid 12 is sandwiched between the base film 11 and the gel layer 17, the coordinate grid 12 does not form the outer surface of the examination marker 10. Therefore, the coordinate grid 12 is not likely to be detached from the base film 11.

The gel layer 17 is located between the base film 11 and the protective film 14 in the thickness direction of the examination marker 10. A surface of the gel layer 17 in contact with the base film 11 is a front surface 17F, and a surface facing away from the front surface 17F is a rear surface 17R. The gel layer 17 covers the entire surface of the coordinate grid 12, and has a thickness sufficient to make the rear surface 17R substantially flat. The gel layer 17 is transparent or translucent.

The gel layer 17 preferably has a shear viscosity at 30° C. of 1,000 mPa·s or more and 200,000 mPa·s or less. More preferably, the shear viscosity at 30° C. of the gel layer 17 is 5,000 mPa·s or more and 50,000 mPa·s or less. The shear viscosity is specified as in JIS Z 8803:2011.

When the shear viscosity is 1,000 mPa·s or more, the gel layer 17 enables adhesion of the base film 11 to the breast with high reliability. On the other hand, when the shear viscosity is 200,000 mPa·s or less, the base film 11 is not likely to have wrinkling or waviness during application of the gel layer 17 to the base film 11. In addition, when the shear viscosity is 200,000 mPa·s or less, the gel layer 17 is not likely to have stickiness that causes discomfort to the subject, and wiping off of the gel layer 17 can be performed without difficulty.

The gel layer 17 is preferably made of at least one selected from the group consisting of paraffin, squalane, and ceresin. These materials enable the gel layer 17 to reliably transmit microwaves, and reduce irritation of the subject's skin.

[Usage of Examination Marker]

Figure 9:
FIG. 9 is a view illustrating a structure of a laminate when an examination marker of the second example is used.
Figure 10:
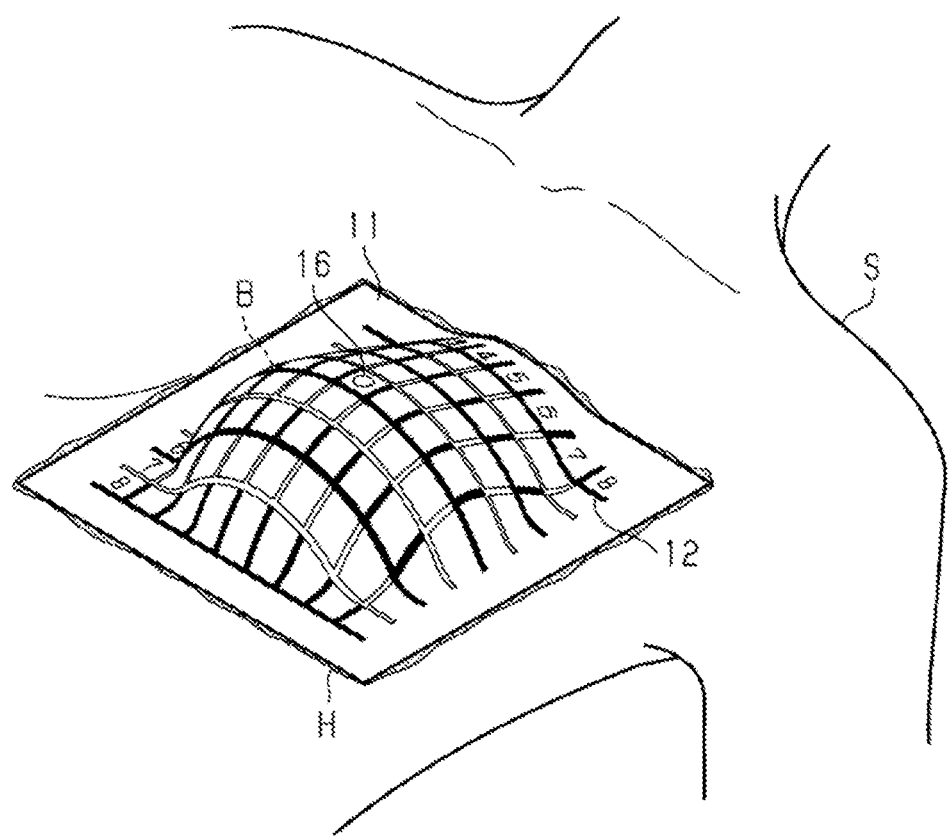
FIG. 10 is a schematic view illustrating usage of an examination marker.

With reference to FIGS. 4, 9 and 10, usage of the examination marker 10 will be described. Usage of the third example of the examination marker 10 will be described with reference to FIG. 4, and usage of the fourth example of the examination marker 10 will be described with reference to FIG. 9.

As shown in FIG. 4, in use of the third example of the examination marker 10, the user first removes the separable film 13 and the protective film 14 from the base film 11. In use of the third example of the examination marker 10, the separable film 13 may be removed earlier than the protective film 14, or the protective film 14 may be removed earlier than the separable film 13.

Further, in use of the third example of the examination marker 10, aliphatic hydrocarbon having the form of an ointment which is similar to the material forming the gel layer 17 is applied to the breast of the subject. The base film 11 is applied to the breast via aliphatic hydrocarbon in the form of an ointment. For smooth examination, it is preferred to apply the aliphatic hydrocarbon ointment to the breast before the separable film 13 and the protective film 14 are removed from the base film 11.

Further, as shown in FIG. 9, in use of the fourth example of the examination marker 10, the user removes the separable film 13 from the base film 11, and removes the protective film 14 from the gel layer 17. As with the case of the first example of the examination marker 10, the separable film 13 may be removed earlier than the protective film 14, or the protective film 14 may be removed earlier than the separable film 13.

As shown in FIG. 10, in both cases where the third example of the examination marker 10 is used and the fourth example of the examination marker 10 is used, the base film 11 is adhered to the breast B of the subject S via an aliphatic hydrocarbon H in the form of an ointment.

TEST EXAMPLES

With reference to FIG. 11, test examples of the examination marker will be described.

Test Example 2-1

A 12-µm thick PET film (manufactured by Toray Industries, Inc., Lumirror S10) (Lumirror is a registered trademark) was prepared as a base film of Test Example 2-1.

Test Example 2-2

A 4.5-µm thick PET film (manufactured by Toray Industries, Inc., Lumirror F48) was prepared as a base film of Test Example 2-2.

Test Example 2-3

A 75-µm thick PET film provided with a release layer (manufactured by Toray Industries, Inc., Cerapeel BX-9) (Cerapeel is a registered trademark) was prepared as a separable film. Then, an EVA resin (ethylene-vinyl acetate copolymer resin) (manufactured by Japan Polyethylene Corporation, Novatec LV440) (Novatec is a registered trademark) was subjected to extrusion lamination molding, using the separable film as a support, to form a 30-µm thick EVA film as a base film. The separable film was then removed to obtain a base film of Test Example 2-3.

Test Example 2-4

A base film of Test Example 2-4 was obtained in the same manner as in Test Example 2-3 except that the thickness of the base film in Test Example 2-3 was changed to 15 µm.

Test Example 2-5

A base film of Test Example 2-5 was obtained in the same manner as in Test Example 2-3 except that the thickness of the base film in Test Example 2-3 was changed to 5 µm.

Test Example 2-6

A 30-µm thick PU film made of ether-based polyurethane resin (manufactured by Nihon Matai Co., Ltd., Esmer URS) (Esmer is a registered trademark) was prepared as a base film of Test Example 2-6.

Test Example 2-7

A 15-µm thick PU film made of ether-based polyurethane resin (manufactured by Okura Industrial Co., Ltd, Silklon HVL85) (Silklon is a registered trademark) was prepared as a base film of Test Example 2-7.

Test Example 2-8

A 5-µm thick PU film (manufactured by Nakajima Industrial Co., Ltd, thin urethane film) was prepared as a base film of Test Example 2-8.

Test Example 2-9

A water transfer tattoo sticker (manufactured by 3M Japan Ltd., A-One transfer sticker, product number: 52103) was prepared. Then, a 5-µm thick PVA layer, which is an image-receiving layer, was prepared as a base film of Test Example 2-9.

[Evaluation Method]
[Tensile Elongation at Break]

In accordance with the method according to JIS K 7127: 1999 "Plastics—Test method of tensile properties—Part 3: Test conditions for films and sheets," each inspection seal was cut into a dumbbell shape (test piece type 5), and a tensile elongation at break of each inspection seal was measured in accordance with the method according to JIS K 7161-1:2014. Specifically, a tensile elongation at break was measured by using a universal tester (Autograph AGS-X, load cell 1 kN, manufactured by Shimadzu Corporation). The test piece was fixed at two positions with grips of the universal tester with the distance between the tips of the grips being set to 80 mm. While the tensile rate was set to 300 mm/min, the test piece was pulled between the fixed positions. Thus, an elongation at break of each test piece was obtained.

[Tensile Strength at 100% Elongation]

In accordance with the method according to JIS K 7127: 1999 "Plastics—Test method of tensile properties—Part 3: Test conditions for films and sheets," each examination marker was cut into a dumbbell shape (test piece type 5), and the tensile strength at 100% elongation of each examination marker was calculated in accordance with the method according to JIS K 7161-1:2014. Specifically, the tensile strength at 100% elongation was calculated by using a universal tester (as above). The test piece was fixed at two positions with grips of the universal tester with the distance between the tips of the grips being set to 80 mm. While the tensile rate was set to 300 mm/min, the test piece was pulled between the fixed positions, and the magnitude of the measured force was divided by the width of the test piece. Thus, a tensile strength at 100% elongation was calculated.

[Adhesion Suitability]

Adhesion suitability of the examination marker was evaluated by using a breast cancer palpation training model (manufactured by Tanac Co., Ltd.). The base film was adhered to the model breast via aliphatic hydrocarbon in the form of an ointment, which is made of paraffin and has a shear viscosity at 30° C. of 10,000 mPa·s, and the following items were evaluated. The viscosity of the aliphatic hydrocarbon was measured in the following procedure. The aliphatic hydrocarbon to be measured was held at 30° C. and measured in accordance with JIS Z 8803:2011 "Method for measuring viscosity with a single cylinder rotational viscometer" by using a B-type viscometer (manufactured by Toki Sangyo Co., Ltd, TVB-25L™ rotor 2). The aliphatic hydrocarbon was used after stirring for 1 minute.

(Item 1) Wrinkling in the Examination Marker

For the item 1, whether the base film showed wrinkling when the base film was adhered to the breast was evaluated in three grades as below. In the three grades, a base film evaluated as "good" or "fair" was determined as an examination marker having adhesion suitability.

Good: No wrinkling occurred

Fair: Fine wrinkles were found, which did not affect the examination

Poor: Large wrinkles to a degree that affected the examination were found

[Evaluation Results]

With reference to FIG. 11, the evaluation results will be described below.

As shown in FIG. 11, the base film made of EVA resin had adhesion suitability when the thickness was 15 µm or less. Further, the base film made of polyurethane resin also had adhesion suitability even when the thickness was 30 µm. However, when the base film had thickness of 30 µm, wrinkling occurred in the base film although it did not affect the examination. Therefore, the thickness of the base film made of polyurethane resin is preferably 30 µm or less. Further, the base film made of PVA resin showed no wrinkling.

On the other hand, the base film made of PET resin had poor adhesion suitability. The reason for this result seems to be that the base film made of PET resin, which has low tensile strength, was not sufficiently stretched when the base film was adhered to the site to be examined.

Therefore, the adhesion suitability can be improved when the base film has a tensile elongation at break of 130% or more and a tensile strength at 100% elongation of 4 N/cm or less.

As described above, according to the second embodiment of the examination marker, the following advantages can be obtained.

(2-1) The examination marker 10 has a tensile elongation at break and a tensile strength at 100% elongation suitable for adhesion to the breast B. Accordingly, the examination marker 10 can be easily adhered to the breast B.

(2-2) Since the base film 11 is made of at least one selected from the group consisting of ether-based polyurethane resin, ester-based polyurethane resin, and carbonate-based polyurethane resin, a base film 11 having high adhesion suitability can be obtained.

(2-3) When the examination marker 10 is provided with the gel layer 17, it is not required to apply a drug to the breast B to adhere the base film 11 to the breast B. Accordingly, the base film 11 can be easily adhered to the breast B.

(2-4) Due to the gel layer 17 having a shear viscosity of 1,000 mPa·s or more, the gel layer 17 enables adhesion of the base film 11 to the breast B with high reliability.

(2-5) Due to the gel layer 17 having a shear viscosity of 200,000 mPa·s or less, the base film 11 is not likely to have wrinkling or waviness during application of the gel layer 17 to the base film 11.

(2-6) Since the gel layer 17 is made of at least one selected from the group consisting of paraffin, squalane, and ceresin, the gel layer 17 can reliably transmit microwaves and reduce irritation of the subject's skin.

[Modifications of Second Embodiment]

The second embodiment described above can be implemented with the following modifications.

[Base Film]

As long as the base film 11 in the examination marker 10 satisfies the above conditions 2-1 and 2-2, the synthetic resin for forming the base film 11 may be a resin other than polyurethane resin. For example, as seen from the base films of the test examples, the synthetic resin for forming the base film 11 may be EVA resin, PVA resin, or the like.

[Gel Layer]

The material for forming the gel layer 17 may also be aliphatic hydrocarbon in the form of an ointment other than paraffin, squalane, and ceresin, as long as it has a higher transmissivity to microwaves than water does and adhere the base film 11 to the breast B.

The gel layer 17 may also have a viscosity lower than 1,000 mPa·s or higher than 200,000 mPa·s as long as the gel layer 17 enables adhesion of the base film 11 to the breast B.

[Separable Film]

The separable film 13 may be omitted. In this case as well, advantages similar to the above (2-1) can be obtained as long as the examination marker 10 includes the base film 11 that satisfies the above conditions 2-1 and 2-2.

[Protective Film]

The protective film 14 may be omitted. In this case as well, advantages similar to the above (2-1) can be obtained as long as the examination marker 10 includes the base film 11 that satisfies the above conditions 2-1 and 2-2.

[Examination Marker]

In the examination marker 10, at least a portion of the base film 11 other than the coordinate grid 12 may have a total light transmittance of 50% or more. In this case, the coordinate grid 12 on the base film 11 can be visually observed when the separable film 13 is removed from the front surface 11F of the base film 11 and the protective film 14 is removed from the rear surface 11R.

Further, in the examination marker 10, a portion other than the coordinate grid 12 in the laminate composed of the separable film 13 and the base film 11 may have a total light transmittance of 50% or more. In this case, the coordinate grid 12 on the base film 11 can be visually observed in adhesion of the examination marker 10 to the site to be examined regardless of whether the separable film 13 is removed or not removed from the base film 11.

Third Embodiment

With reference to FIGS. 2, 12 and 13, a third embodiment of an examination marker will be described. In the third embodiment, components common to those in the examination marker 10 of the first embodiment are denoted by the same reference signs as in the first embodiment, and detailed description thereof will be omitted. In the following description, an examination marker and test examples are each described.

[Examination Marker]

With reference to FIG. 2, an examination marker will be described.

As with the examination marker 10 of the first embodiment, the examination marker in the present embodiment is a marker for use in mammography, which is an example of diagnostic imaging using microwaves. The examination marker is a marker to be adhered to the breast, which is a site examined in mammography.

The examination marker 10 has the same structure as that of the second example of the examination marker 10 in the first embodiment, which was described earlier with reference to FIG. 2. In the present embodiment, the base film 11 is made of polyurethane resin. The adhesive layer 15 is made of urethane-based adhesive. The adhesive layer 15 is laminated on the base film 11. The adhesive layer 15 has a thickness of 5 μm or more and 25 μm or less.

In the examination marker 10 of the present embodiment, a laminate composed of the base film 11 and the adhesive layer 15 satisfies the following three conditions.

(Condition 3-1) The tensile elongation at break according to JIS K 7127 is 130% or more.

(Condition 3-2) The tensile stress at 100% elongation is 10 MPa or less.

(Condition 3-3) The water vapor transmission rate according to JIS Z 0208 is 750 g/m²·day or more under conditions of 40° C. and 90% RH.

The examination marker 10 has a tensile elongation at break and a tensile stress at 100% elongation suitable for adhesion to a site to be examined. Accordingly, the examination marker 10 can be easily adhered to a site to be examined. Further, due to the water vapor transmission rate of the examination marker 10 being within the above range, sweating at the site to be examined can be suppressed when the examination marker 10 is adhered to a site to be examined.

The polyurethane resin for forming the base film 11 includes one selected from the group consisting of ether-based polyurethane resin, ester-based polyurethane resin, and carbonate-based polyurethane resin. Accordingly, the base film 11 having high adhesion suitability and high water vapor transmission rate can be provided.

The ether-based polyurethane resin is a polyurethane resin produced using an ether-based polyol containing an ether bond (—O—). The ester-based polyurethane resin is a polyurethane resin produced using an ester-based polyol containing an ester bond (—COO—). The carbonate-based polyurethane resin is a polyurethane resin produced using a polyol containing a carbonate bond (—OC(=O)O—).

When the base film 11 is formed of an ether-based polyurethane resin, the base film 11 preferably has a thickness of 30 μm or less. The base film 11 may have a thickness of, for example, 5 μm or more and 30 μm or less. When the base film 11 is formed of an ester-based polyurethane resin, the base film 11 may have a thickness of, for example, 5 μm or more and 15 μm or less. When the base film 11 is formed of a carbonate-based polyurethane resin, the base film 11 may have a thickness of, for example, 5 μm or more and 15 μm or less.

The base film 11 has a pair of surfaces facing away from each other. The pair of surfaces facing away from each other are composed of the front surface 11F and the rear surface 11R. One of the pair of surfaces is a guide surface on which the coordinate grid 12 is printed. In the present embodiment, the coordinate grid 12 is provided on the rear surface 11R. That is, the rear surface 11R is an example of the guide surface. The base film 11 is transparent or translucent. In the base film 11, the total light transmittance according to JIS K 7361-1 is preferably 30% or more, and more preferably 50% or more.

The adhesive layer 15 is transparent or translucent. The total light transmittance of the adhesive layer 15 is preferably 50% or more.

The separable film 13 and the protective film 14 are preferably made of a transparent or translucent synthetic resin film.

TEST EXAMPLES

With reference to FIGS. 12 and 13, test examples of the examination marker will be described.

Test Example 3-1

A 12-μm thick PET film (manufactured by Toray Industries, Inc., Lumirror S10) (Lumirror is a registered trademark) was prepared as a base film. Further, a protective film having a thickness of 38 μm and composed of a PET film and a release layer (manufactured by Toray Industries, Inc., Cerapeel WZ) (Cerapeel is a registered trademark) was prepared. An acrylic adhesive (manufactured by CosMED Pharmaceutical Co. Ltd., HiPAS10) (HiPAS is a registered trademark) was applied to the protective film by gravure coating, and dried. Thus, an adhesive layer having a thickness of 20 μm was obtained. Then, the base film was bonded to the adhesive layer to obtain a laminate. The laminate was aged in an environment of 40° C. to obtain an examination marker of Test Example 3-1.

Test Example 3-2

An examination marker of Test Example 3-2 was obtained in the same manner as in Test Example 3-1 except that the base film in Test Example 3-1 was changed to a 4.5-μm thick PET film (manufactured by Toray Industries, Inc., Lumirror F48).

Test Example 3-3

A 75-μm thick PET film provided with a release layer (manufactured by Toray Industries, Inc., Cerapeel BX-9) was prepared as a separable film. Then, an EVA resin (manufactured by Japan Polyethylene Corporation, Novatec LV440) (Novatec is a registered trademark) was subjected to extrusion lamination molding, using the separable film as a support, to form a 30-μm thick EVA film as a base film. Except for the above, the same manner as in Test Example 3-1 was used to obtain the examination marker of Test Example 3-3. When the protective film coated with the adhesive layer was bonded to the base film, the laminate composed of the separable film and the base film was bonded to the adhesive layer. Then, after the laminate composed of the separable film, the base film, the adhesive layer, and the protective film was aged, the separable film was removed to obtain the examination marker of Test Example 3-3.

Test Example 3-4

An examination marker of Test Example 3-4 was obtained in the same manner as in Test Example 3-3 except that the thickness of the base film in Test Example 3-3 was changed to 15 μm.

Test Example 3-5

An examination marker of Test Example 3-5 was obtained in the same manner as in Test Example 3-3 except that the thickness of the base film in Test Example 3-3 was changed to 5 μm.

Test Example 3-6

An examination marker of Test Example 3-6 was obtained in the same manner as in Test Example 3-5 except that an adhesive layer in Test Example 3-5 was made of a urethane-based adhesive (manufactured by Toyochem Co., Ltd., SP-205). In formation of the adhesive layer, 1% of a curing agent (manufactured by Toyochem Co., Ltd., T-501B) was added to the urethane-based adhesive. Then, the urethane-based adhesive was stirred to obtain a coating liquid for forming an adhesive layer.

Test Example 3-7

An examination marker of Test Example 3-7 was obtained in the same manner as in Test Example 3-1 except that the base film in Test Example 3-1 was changed to a 30-μm thick PU film (manufactured by Nihon Matai Co., Ltd., Esmer URS) (Esmer is a registered trademark).

Test Example 3-8

An examination marker of Test Example 3-8 was obtained in the same manner as in Test Example 3-7 except that the thickness of the adhesive layer in Test Example 3-7 was changed to 10 μm.

Test Example 3-9

An examination marker of Test Example 3-9 was obtained in the same manner as in Test Example 3-7 except that the thickness of the adhesive layer in Test Example 3-7 was changed to 5 μm.

Test Example 3-10

An examination marker of Test Example 3-10 was obtained in the same manner as in Test Example 3-7 except that the thickness of the adhesive layer in Test Example 3-7 was changed to 30 μm.

Test Example 3-11

A 30-μm thick PU film made of ether-based polyurethane resin (manufactured by Nihon Matai Co., Ltd., Esmer URS) was prepared as a base film. Further, a protective film having a thickness of 30 μm and composed of a PET film and a release layer (manufactured by Toray Industries, Inc., Cerapeel WZ) was prepared. 1% of a curing agent (manufactured by Toyochem Co., Ltd., T-501B) was added to a urethane-based adhesive (manufactured by Toyochem Co., Ltd., SP-205), and the mixture was stirred to prepare a coating liquid. Then, the coating liquid was applied to the protective film by gravure coating, and the urethane-based adhesive was dried. Thus, an adhesive layer having a thickness of 20 μm was obtained. Then, the base film was bonded to the adhesive layer to obtain a laminate. The laminate was aged in an environment of 40° C. to obtain an examination marker of Test Example 3-11.

Test Example 3-12

An examination marker of Test Example 3-12 was obtained in the same manner as in Test Example 3-11 except that the thickness of the adhesive layer in Test Example 3-11 was changed to 10 μm.

Test Example 3-13

An examination marker of Test Example 3-13 was obtained in the same manner as in Test Example 3-11 except that the thickness of the adhesive layer in Test Example 3-11 was changed to 5 μm.

Test Example 3-14

An examination marker of Test Example 3-14 was obtained in the same manner as in Test Example 3-11 except that the thickness of the adhesive layer in Test Example 3-11 was changed to 30 μm.

Test Example 3-15

An examination marker of Test Example 3-15 was obtained in the same manner as in Test Example 3-1 except that the base film in Test Example 3-1 was changed to a 15-μm thick PU film made of ether-based polyurethane resin (manufactured by Okura Industrial Co., Ltd, Silklon HVL85) (Silklon is a registered trademark).

Test Example 3-16

An examination marker of Test Example 3-16 was obtained in the same manner as in Test Example 3-11 except that the base film in Test Example 3-11 was changed to a 15-μm thick PU film made of ether-based polyurethane resin (manufactured by Okura Industrial Co., Ltd, Silklon HVL85).

Test Example 3-17

An examination marker of Test Example 3-17 was obtained in the same manner as in Test Example 3-1 except that the base film in Test Example 3-1 was changed to a 5-μm thick PU film (manufactured by Nakajima Industrial Co., Ltd, thin urethane film).

Test Example 3-18

An examination marker of Test Example 3-18 was obtained in the same manner as in Test Example 3-17 except that the thickness of the adhesive layer in Test Example 3-17 was changed to 10 μm.

Test Example 3-19

An examination marker of Test Example 3-19 was obtained in the same manner as in Test Example 3-17 except that the thickness of the adhesive layer in Test Example 3-17 was changed to 5 μm.

Test Example 3-20

An examination marker of Test Example 3-20 was obtained in the same manner as in Test Example 3-17 except that the thickness of the adhesive layer in Test Example 3-17 was changed to 30 μm.

Test Example 3-21

An examination marker of Test Example 3-21 was obtained in the same manner as in Test Example 3-11 except that the base film in Test Example 3-11 was changed to a 5-μm thick PU film (manufactured by Nakajima Industrial Co., Ltd, thin urethane film).

Test Example 3-22

An examination marker of Test Example 3-22 was obtained in the same manner as in Test Example 3-21 except that the thickness of the adhesive layer in Test Example 3-21 was changed to 10 μm.

Test Example 3-23

An examination marker of Test Example 3-23 was obtained in the same manner as in Test Example 3-21 except that the thickness of the adhesive layer in Test Example 3-21 was changed to 5 μm.

Test Example 3-24

An examination marker of Test Example 3-24 was obtained in the same manner as in Test Example 3-21 except that the thickness of the adhesive layer in Test Example 3-21 was changed to 30 μm.

Test Example 3-25

A water transfer tattoo sticker (manufactured by 3M Japan Ltd., A-One transfer sticker, product number: 52103) was prepared. Then, in place of the base film, an enclosed adhesive layer was bonded to a PVA layer, which is an image-receiving layer, to thereby obtain an examination marker of Test Example 3-25. Since the PVA layer was applied to a release paper, the release paper was moistened using a tissue wetted with water after the PVA layer was bonded to the adhesive layer to thereby transfer the PVA layer to the adhesive layer. Thus, the PVA layer was removed from the release paper. The laminate including the PVA layer and the adhesive layer was left standing in an environment of 40° C. for 2 hours to sufficiently dry a surface of the PVA layer. Then, evaluation of the examination marker of Test Example 3-25 was performed. In adhesion of the examination marker of Test Example 3-25, the laminate including the release paper and the PVA layer was bonded to the adhesive layer laminated on the separable film, and then the separable film on the adhesive layer was removed. After the adhesive layer was adhered to a target, the release paper was moistened to remove the release paper from the PVA layer. In this state, the adhesion suitability of the examination marker of Test Example 3-25 was evaluated.

Test Example 3-26

A 75-μm thick PET film provided with a release layer (manufactured by Toray Industries, Inc., Cerapeel BX-9) was prepared as a separable film. Then, an aqueous polyurethane containing ester-based polyol (manufactured by Mitsui Chemicals, Inc., TAKELAC WS-5984) (TAKELAC is a registered trademark) was applied and dried. Subsequently, the dried layer was left at room temperature for aging for 2 days to thereby obtain a base film having a thickness of 15 μm. An adhesive layer was formed on the base film in the same manner as that in Test Example 3-6 to thereby obtain an examination marker of Test Example 3-26.

Test Example 3-27

An examination marker of Test Example 3-27 was obtained in the same manner as in Test Example 3-26 except that the thickness of the adhesive layer in Test Example 3-26 was changed to 10 μm.

Test Example 3-28

An examination marker of Test Example 3-28 was obtained in the same manner as in Test Example 3-26 except that the thickness of the base film in Test Example 3-26 was changed to 5 μm.

Test Example 3-29

An examination marker of Test Example 3-29 was obtained in the same manner as in Test Example 3-28 except that the thickness of the adhesive layer in Test Example 3-28 was changed to 10 μm.

Test Example 3-30

An examination marker of Test Example 3-30 was obtained in the same manner as in Test Example 3-26 except that the aqueous polyurethane containing ester-based polyol in Test Example 3-26 was changed to aqueous polyurethane containing ether-based polyol (manufactured by Mitsui Chemicals, Inc., TAKELAC WS-6021).

Test Example 3-31

An examination marker of Test Example 3-31 was obtained in the same manner as in Test Example 3-30 except that the thickness of the adhesive layer in Test Example 3-30 was changed to 10 μm.

Test Example 3-32

An examination marker of Test Example 3-32 was obtained in the same manner as in Test Example 3-30 except that the thickness of the base film in Test Example 3-30 was changed to 5 μm.

Test Example 3-33

An examination marker of Test Example 3-33 was obtained in the same manner as in Test Example 3-30 except that the thickness of the adhesive layer in Test Example 3-30 was changed to 10 μm.

Test Example 3-34

An examination marker of Test Example 3-34 was obtained in the same manner as in Test Example 3-26 except that the aqueous polyurethane containing ester-based polyol in Test Example 3-26 was replaced by an aqueous polyurethane containing carbonate-based polyol (manufactured by Mitsui Chemicals, Inc., TAKELAC W-6110).

Test Example 3-35

An examination marker of Test Example 3-35 was obtained in the same manner as in Test Example 3-34 except that the thickness of the adhesive layer in Test Example 3-34 was changed to 10 μm.

Test Example 3-36

An examination marker of Test Example 3-36 was obtained in the same manner as in Test Example 3-34 except that the thickness of the base film in Test Example 3-34 was changed to 5 μm.

Test Example 3-37

An examination marker of Test Example 3-37 was obtained in the same manner as in Test Example 3-36 except that the thickness of the adhesive layer in Test Example 3-36 was changed to 10 μm.

[Evaluation Method]
[Tensile Elongation at Break]

In accordance with the method according to JIS K 7127 "Plastics—Test method of tensile properties—Part 3: Test conditions for films and sheets," a tensile elongation at break was measured. In measurement of the tensile elongation at break, each examination marker was cut into a dumbbell shape (test piece type 5), and a tensile elongation at break was measured by using a tensile tester. The test rate was set to 300 mm/min, and the gauge length L0 was set to 25 mm. The elongation at break was calculated by measuring the amount of elongation when the test piece was broken. In measurement of the tensile elongation at break, the laminate composed of only the base film and the adhesive layer was used.

[Tensile Stress at 100% Elongation]

In measurement of the tensile elongation at break, the tensile stress at the time when the gauge length $L_0$ reached 100% elongation was calculated by dividing the tensile force applied at the time when the examination marker was elongated to 100% by the initial value of the cross-sectional area of the examination marker.

[Adhesion Suitability]

Adhesion suitability of the examination marker was evaluated by using a breast cancer palpation training model (manufactured by Tanac Co., Ltd.). The examination marker was adhered to the model breast, the following three items were evaluated.

(Item 1) Wrinkling in the examination marker
(Item 2) Lifting of the examination marker
(Item 3) Repeated adhesion and peeling (reworkability) of the examination marker For the item 1, whether the examination marker showed wrinkling when the examination marker was adhered to the breast was evaluated in three grades as below. In the three grades, an examination marker evaluated as "good" or "fair" was determined as an examination marker having adhesion suitability.

Good: No wrinkling occurred
Fair: Fine wrinkles were found, which did not affect the examination
Poor: Large wrinkles to a degree that affected the examination were found For the item 2, whether the examination marker partially lifted from the breast when the examination marker was adhered to the breast was evaluated in three grades as below. In the three grades, an examination marker evaluated as "good" or "fair" was determined as an examination marker having adhesion suitability.

Good: No Lifting occurred
Fair: The examination marker lifted due to a raised part of the nipple, which did not affect the examination
Poor: The examination marker lifted significantly from the breast to a degree that affected the examination For the item 3, the examination marker was subjected to an operation in which the examination marker was adhered to the breast, then removed from the breast, and then again adhered to the breast. The results were evaluated in three grades as below.

Good: The examination marker was successfully adhered again
Fair: During removal of the examination marker, the examination marker deformed but was successfully adhered again for use
Poor: During removal of the examination marker, the examination marker was torn or failed to be adhered again

[Water Vapor Transmission Rate]

The water vapor transmission rate of the examination marker was measured in accordance with the method according to JIS Z 0208 "Testing methods for determination of the water vapor transmission rate of moisture-proof packaging materials (dish method)." In measurement of the water vapor transmission rate, calcium chloride (anhydrous) was weighed as a moisture absorbent. Then, the initial weight of a permeability cup including the moisture absorbent was measured by using an electronic scale. After the examination marker was left standing in an environment of 40° C. and 90% RH for 2 hours, the permeability cup was weighed. Then, a gain in weight of the permeability cup was determined as the amount of water vapor transmitted.

[Sweating Test]

Test pieces of 5 cm square were cut from the examination marker. A test piece was adhered to the arm of three healthy subjects. The subjects rested quietly in a test room at 40° C. and 20% RH for 5 minutes. After the test piece was removed from each subject, a portion of the subject's arm where the test piece was removed was observed to determine whether sweating had occurred.

Good: No sweating observed in any of the subjects
Poor: Sweating observed in at least one subject

[Evaluation Results]

With reference to FIGS. 12 and 13, the evaluation results will be described below.

As shown in FIG. 12, when the base film made of polyurethane resin was used, occurrence of wrinkling in the examination marker was reduced and the reworkability of the examination marker was improved. Further, when the base film had a thickness of 30 μm, wrinkling occurred in the examination marker although it did not affect the examination. Therefore, the thickness of the base film made of polyurethane resin is preferably 30 μm or less. In addition, when the base film had a thickness of 5 μm, deformation of the examination marker was observed in the reworkability test although it did not affect the examination. Therefore, the thickness of the base film is preferably 5 μm or more.

Further, when the base film having high adhesion suitability was used, the examination marker was found to satisfy the tensile elongation at break of 420% or more and the tensile stress at 100% elongation of 10 MPa or less. Thus, the examination marker was able to have high adhesion suitability. Further, when the base film having high water vapor transmission rate was used, the examination marker had the water vapor transmission rate of 783 g/m$^2$·day or more, which reduced sweating.

On the other hand, the base film made of PET resin had poor adhesion suitability. The reason for this result seems to be that the base film made of polyethylene terephthalate resin, which has low tensile elongation, was not sufficiently stretched when the examination marker was adhered to the site to be examined. Further, in the base film made of EVA resin, it is possible to improve the adhesion suitability of the base film by reducing the thickness to 5 μm. However, this may cause occurrence of sweating to a degree that affects the examination in a portion where the examination marker is adhered since a base film made of EVA resin has a low water vapor transmission rate. In addition, according to the base film made of PVA resin, the examination marker had low reworkability since the base film was torn. Meanwhile, since the base film made of PVA resin did not have wrinkling and lifting, the tensile elongation at break required to improve adhesion suitability may be 130% or more.

For the adhesive forming the adhesive layer, it was found that a urethane-based adhesive had higher water vapor transmission rate than an acrylic adhesive. When the adhesive layer was formed of a urethane-based adhesive, the examination marker had the water vapor transmission rate of 750 g/m$^2$·day or more, which reduced sweating. In addition, when the adhesive layer was thin, the examination marker had a high water vapor transmission rate, which reduced sweating. However, this causes the examination marker to be lifted due to the raised part of the nipple. Further, even when the adhesive layer was made of a urethane-based adhesive, the adhesive layer having a thickness of 30 μm had a low water vapor transmission rate, and was not likely to suppress sweating of the subject. Further, a too thick adhesive layer causes too strong adhesion of the adhesive layer. Accordingly, in removal of the examination marker, the subject may suffer discomfort or the examination marker may be torn depending on the combination with the base film. In this sense, the thickness of the adhesive layer is preferably 5 μm or more and 25 μm or less.

As shown in FIG. 13, the tensile elongations at break were different depending on the polyol constituting the polyurethane resin, and accordingly the examination results were different. A base film made of ester-based polyurethane resin or ether-based polyurethane resin had higher tensile elongation at break than a base film made of carbonate-based polyurethane resin, and thus wrinkling was less likely to occur. Further, compared with the base film made of ester-based polyurethane resin or ether-based polyurethane resin, the base film made of carbonate-based polyurethane resin was not likely to deform in the reworkability test even when the base film was thin. Further, the base film made of ether-based polyurethane resin had higher water vapor transmission rate than the base film made of ester-based polyurethane resin or carbonate-based polyurethane resin, and thus sweating of the subject was suppressed even when the base film was thicker.

As described above, when the base film made of polyurethane resin having high adhesion suitability was used, the examination marker was found to satisfy the tensile elongation at break of 310% or more and the tensile stress at 100% elongation of 10 MPa or less. Thus, the examination marker was able to have high adhesion suitability. Further, when a base film made of polyurethane resin having high water vapor transmission rate was used, the examination marker was found to have the water vapor transmission rate of 783 g/m$^2$·day or more, which reduced sweating.

As described above, according to the third embodiment of the examination marker, the following advantages can be obtained.

(3-1) The examination marker 10 has a tensile elongation at break and a tensile stress at 100% elongation suitable for adhesion to the breast B. Accordingly, the examination marker 10 can be easily adhered to the breast B. Further, due to the water vapor transmission rate of the examination marker 10 being within the above range, sweating of the breast B can be suppressed when the examination marker 10 is adhered to the breast B.

(3-2) Due to the base film 11 made of ether-based polyurethane resin, ester-based polyurethane resin, or carbonate-based polyurethane resin, the base film 11 having high adhesion suitability and high water vapor transmission rate can be obtained.

[Modifications of Third Embodiment]

The third embodiment described above can be implemented with the following modifications.

[Base Film]

As long as the laminate composed of the base film 11 and the adhesive layer 15 in the examination marker 10 satisfies the above conditions 3-1 to 3-3, the synthetic resin for forming the base film 11 may be a resin other than polyurethane resin.

[Adhesive Layer]

As long as the laminate composed of the base film 11 and the adhesive layer 15 in the examination marker 10 satisfies the above conditions 3-1 to 3-3, the adhesive for forming the adhesive layer 15 may be a resin other than urethane-based adhesive.

[Separable Film]

The separable film 13 may be omitted. In this case as well, advantages similar to the above (3-1) can be obtained as long as the examination marker 10 includes the base film 11 and the adhesive layer 15.

[Protective Film]

The protective film 14 may be omitted. In this case as well, advantages similar to the above (3-1) can be obtained as long as the examination marker 10 includes the base film 11 and the adhesive layer 15.

[Examination Marker]

In the examination marker 10, at least a portion other than the coordinate grid 12 in the laminate composed of the base film 11 and the adhesive layer 15 may have a total light transmittance of 50% or more. In this case, the coordinate grid 12 on the base film 11 can be visually observed when the separable film 13 is removed from the base film 11 and the protective film 14 is removed from the adhesive layer 15.

Further, in the examination marker 10, a portion other than the coordinate grid 12 in the laminate composed of the separable film 13, the base film 11, and the base film 15 may have a total light transmittance of 50% or more. In this case, the coordinate grid 12 on the base film 11 can be visually observed during adhesion of the examination marker 10 to the site to be examined regardless of whether the separable film 13 is removed from the base film 11.

Fourth Embodiment

With reference to FIGS. 2, and 14 to 17, a fourth embodiment of an examination marker will be described. In the fourth embodiment, components common to those in the examination marker 10 of the first embodiment are denoted by the same reference signs as in the first embodiment, and detailed description thereof will be omitted. In the following description, an examination marker, a method of producing the examination marker, and test examples are each described.

[Examination Marker]

With reference to FIG. 2, an examination marker will be described.

As with the examination marker 10 of the first embodiment, the examination marker in the present embodiment is a marker for use in mammography, which is an example of diagnostic imaging using microwaves. The examination marker is a marker to be adhered to the breast, which is a site examined in mammography.

The examination marker 10 has the same structure as that of the second example of the examination marker 10 in the first embodiment, which was described earlier with reference to FIG. 2. The examination marker 10 include the base film 11 and the adhesive layer 15. The base film 11 is provided with a coordinate grid 12 used for guiding a scan position in a site to be examined. The coordinate grid 12 is an example scan index. The adhesive layer 15 is laminated on the base film 11. The base film 11 includes the rear surface 11R, which is a surface in contact with the adhesive layer 15, and the front surface 11F facing away from the rear surface 11R. The front surface 11F is a surface scanned with a probe during the examination of a site to be examined.

In the present embodiment, the front surface 11F of the base film 11 satisfies the following two conditions.

(Condition 4-1) The arithmetic average roughness Ra according to JIS B 0601:2013 is 0.1 μm or more.

(Condition 4-2) The dynamic friction coefficient between the front surface 11F and a metallic surface in accordance with JIS K 7125:1999 is 3 or less.

Since the arithmetic average roughness Ra of the front surface 11F of the base film 11 is 0.1 μm or more, and the dynamic friction coefficient between the front surface 11F of the base film 11 and a metallic surface is 3 or less, the probe can smoothly move on the front surface 11F when the front surface 11F of the base film 11 is scanned with the probe. Accordingly, the front surface 11F of the base film 11 can be smoothly scanned with the probe.

The examination marker 10 further includes the separable film 13. The separable film 13 has a surface to be coated made of a polypropylene resin or a polyethylene resin. The front surface 11F of the base film 11 is a surface in contact with the surface to be coated, and has a shape conforming to the surface to be coated.

The surface to be coated of the separable film 13 preferably satisfies the following condition.

(Condition 4-3) The arithmetic average roughness Ra according to JIS B 0601:2013 of the surface to be coated is 0.2 μm or more.

When the base film 11 is formed by applying a coating liquid for forming the base film 11 to the surface to be coated of the separable film 13, the arithmetic average roughness Ra of the front surface 11F of the base film 11 tends to be smaller than the arithmetic average roughness Ra of the surface to be coated of the separable film 13. Further, the arithmetic average roughness Ra of the front surface 11F of the base film 11 tends to be larger as the arithmetic average roughness Ra of the surface to be coated of the separable film 13 becomes large.

As described above, the arithmetic average roughness Ra of the surface to be coated of the separable film 13 is 0.2 μm or more. Accordingly, when the base film 11 is formed by applying a coating liquid for forming the base film 11 to the surface to be coated, the possibility that the front surface 11F of the base film 11 has the arithmetic average roughness Ra of 0.1 μm or more increases. Thus, an examination marker 10 including a base film 11 having a front surface 11F that can be more smoothly scanned with a probe can be obtained.

Further, the separable film 13 preferably has peel strength from the base film 11 that satisfies the following condition.

(Condition 4-4) The peel strength according to JIS Z 0237:2009 is 0.3 N/25 mm or less.

When the peel strength is 0.3 N/25 mm or less, removal of the separable film 13 from the base film 11 can be performed without difficulty. This increases ease of handling of the examination marker 10. Further, with an increase in the arithmetic average roughness Ra of at least one of the surfaces at the interface between two layers, the peel strength between the two layers tends to increase. In addition, with an increase in the arithmetic average roughness Ra of at least one of surfaces at the interface between two layers, the adhesion suitability between the two layers tends to increase. According to the present embodiment, while the front surface 11F of the base film 11 has an arithmetic average roughness Ra of 0.1 μm or more, the separable film 13 has a peel strength from the base film 11 of 0.3 N/25 mm or less. Accordingly, both smooth scanning with a probe and the ease of handling of the examination marker 10 can be improved.

The front surface 11F of the base film 11 preferably further satisfies the following condition.

(Condition 4-5) The arithmetic average roughness Ra according to JIS B 0601:2013 is less than 5 μm.

Due to the arithmetic average roughness Ra of the front surface 11F of the base film 11 being less than 5 μm, the possibility that the separable film 13 has the peel strength from the base film 11 of 0.3 N/25 mm or less increases.

The surface to be coated of the separable film 13 preferably further satisfies the following condition.

(Condition 4-6) The arithmetic average roughness Ra according to JIS B 0601:2013 is less than 7 μm.

Since the surface to be coated of the separable film 13 has the arithmetic average roughness Ra of less than 7 μm, when the base film 11 is formed by applying a coating liquid for forming the base film 11 to the surface to be coated, the possibility that the front surface 11F of the base film 11 has the arithmetic average roughness Ra of less than 5 μm increases. Accordingly, removal of the separable film 13 from the base film 11 can be performed without difficulty.

The synthetic resin for forming the base film 11 may be, for example, a polyurethane resin. The polyurethane resin includes at least one selected from the group consisting of ether-based polyurethane resin, ester-based polyurethane resin, and carbonate-based polyurethane resin. Accordingly, the base film 11 having high adhesion suitability and high water vapor transmission rate can be provided.

The ether-based polyurethane resin is a polyurethane resin produced using an ether-based polyol containing an ether bond (—O—). The ester-based polyurethane resin is a polyurethane resin produced using an ester-based polyol containing an ester bond (—COO—). The carbonate-based polyurethane resin is a polyurethane resin produced using a polyol containing a carbonate bond (—OC(=O)O—). The base film 11 may have a thickness of, for example, 5 μm or more and 30 μm or less.

The base film 11 is transparent or translucent. In the base film 11, the total light transmittance according to JIS K 7361-1 is preferably 30% or more, and more preferably 50% or more.

The adhesive layer 15 is transparent or translucent. The adhesive layer 15 preferably has a total light transmittance of 30% or more, and more preferably 50% or more.

The adhesive for forming the adhesive layer 15 may be, for example, a urethane-based adhesives. The adhesive layer 15 made of a urethane-based adhesive can have a high water vapor transmission rate. The adhesive layer 15 may have a thickness of, for example, 5 μm or more and 25 μm or less.

A portion of the examination marker 10 other than the coordinate grid 12 preferably has a total light transmittance according to JIS K 7361-1 of 30% or more, and more preferably 50% or more.

The separable film 13 and the protective film 14 are preferably made of a transparent or translucent synthetic resin film.

[Method for Producing Examination Marker]

Figure 14:
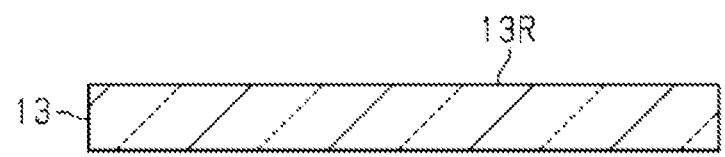
FIG. 14 is a diagram illustrating a step of manufacturing an examination marker in a fourth embodiment.
Figure 15:
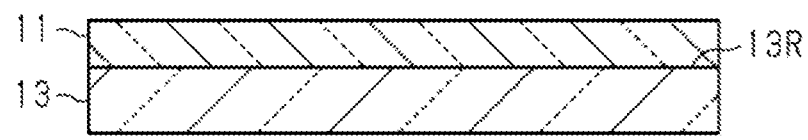
FIG. 15 is a diagram illustrating a step of manufacturing an examination marker in the fourth embodiment.
Figure 16:
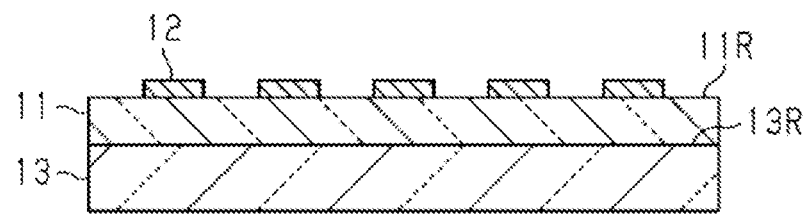
FIG. 16 is a diagram illustrating a step of manufacturing an examination marker in the fourth embodiment.

With reference to FIGS. 14 to 16, a method for producing an examination marker 10 will be described.

As shown in FIG. 14, a separable film 13 is first prepared for producing the examination marker 10. As described above, it is preferred to prepare a separable film 13 having the surface to be coated 13R, which is a surface to be coated with a coating liquid, with the arithmetic average roughness Ra of 0.2 μm or more and less than 7 μm.

In use of the examination marker 10, the separable film 13 is removed from the base film 11. Therefore, the material for the base film 11 and the material for the separable film 13, in particular the surface to be coated 13R, are materials that can be separated from each other. For example, the material for the base film 11 is preferably a polyurethane resin, and the material for the surface to be coated 13R is preferably a polypropylene resin or a polyethylene resin.

When a coating liquid for forming the base film 13 is applied to the surface to be coated 13R of the base film 13, the coating liquid preferably has high wettability with the surface to be coated 13R. Accordingly, the base film 13 can be prevented from varying in thickness across the entirety of the surface to be coated 13R. In this regard, the arithmetic average roughness Ra of the surface to be coated 13R of 0.2 μm or more as described above can also contribute to high wettability of the coating liquid with the surface to be coated 13R.

As shown in FIG. 15, a coating liquid for forming the base film 11 is applied to the surface to be coated 13R. Then, the coating liquid is dried to form the base film 11. Here, since the coating liquid has a sufficient wettability with the surface to be coated 13R, the coating liquid for forming the base film 11 is dried while conforming to the unevenness of the surface to be coated 13R. Accordingly, the front surface 11F of the base film 11 has unevenness in accordance with the unevenness of the surface to be coated 13R.

As shown in FIG. 16, the coordinate grid 12 and the mark 16 are printed on the rear surface 11R of the base film 11. In addition, the coordinate grid 12 and the mark 16 are preferably printed by using a pigment that satisfies cosmetic standards stipulated in the "Order for enforcement of the act on securing quality, efficacy and safety of products including pharmaceuticals and medical devices." Preferably, the solvent or dispersion medium for the pigment does not contain toluene.

Then, the adhesive layer 15 formed on the protective film 14 is bonded to the base film 11 to thereby obtain the examination marker 10 described above with reference to FIG. 2. In addition, the adhesive for forming the adhesive layer 15 is preferably one that satisfies the biocompatibility stipulated in ISO 10993.

TEST EXAMPLES

With reference to FIG. 17, test examples of the examination marker will be described.

Test Example 4-1

A biaxially oriented polypropylene (OPP) film (manufactured by Futamura Chemical Co., Ltd., FOS) was prepared as a separable film. Then, an aqueous polyurethane containing ether-based polyol (manufactured by Mitsui Chemicals, Inc., TAKELAC WS-6021) (TAKELAC is a registered trademark) was applied and dried. Subsequently, the dried layer was left at room temperature for aging for 2 days to thereby obtain a base film having a thickness of Thus, an examination marker of Test Example 4-1 was prepared.

Test Example 4-2

A biaxially oriented polypropylene (OPP) film (manufactured by Futamura Chemical Co., Ltd., FOR-MP) having a matte surface as one of a pair of surfaces was prepared. A non-matte surface, which is a surface facing away from the matte surface, was subjected to sandblasting to form a fine texture. Then, a base film was formed on the non-matte surface in the same manner as in Test Example 4-1. Thus, an examination marker of Test Example 4-2 was prepared.

Test Example 4-3

A polypropylene (PP) laminate release paper (manufactured by Lintec Corporation, EV130TPSG) was prepared as a separable film. Then, a base film was formed on one surface of the separable film in the same manner as in Test Example 4-1. Thus, an examination marker of Test Example 4-3 was prepared.

Test Example 4-4

A polypropylene (PP) laminate release paper (manufactured by Lintec Corporation, EV130TPD) was prepared as a separable film. Then, a base film was formed on one surface of the separable film in the same manner as in Test Example 4-1. Thus, an examination marker of Test Example 4-4 was prepared.

Test Example 4-5

An examination marker of Test Example 4-5 was obtained in the same manner as in Test Example 4-4 except that the aqueous polyurethane containing ether-based polyol was replaced by an aqueous polyurethane containing ether-based polyol (manufactured by Mitsui Chemicals, Inc., TAKELAC W-5661).

Test Example 4-6

An examination marker of Test Example 4-6 was obtained in the same manner as in Test Example 4-4 except that the aqueous polyurethane containing ether-based polyol was replaced by an aqueous polyurethane containing carbonate-based polyol (manufactured by Mitsui Chemicals, Inc., TAKELAC W-6110).

Test Example 4-7

An examination marker of Test Example 4-7 was obtained in the same manner as in Test Example 4-3 except that the separable film was replaced by a polypropylene (PP) laminate release paper (manufactured by Lintec Corporation, EV130TPD FN-L).

[Evaluation Method]
[Arithmetic Average Roughness Ra]

An arithmetic average roughness Ra was measured by using surface roughness and contour measuring instrument (manufactured by Tokyo Seimitsu Co., Ltd., SURFCOM 130A) (SURFCOM is a registered trademark) using the method according to JIS B 0601:2013 "Geometrical product specifications (GPS)—Surface texture: profile method—Terms, definitions and surface texture parameters."

[Dynamic Friction Coefficient]

A dynamic friction coefficient of a front surface of the base film was measured in accordance with a method according to JIS K 7125:1999 "Plastics—Film and sheeting—Determination of the coefficients of friction." In measurement of the dynamic friction coefficient, a friction tester (manufactured by Toyo Seiki Seisaku-sho, Ltd., TR-2) was used.

In measurement of the dynamic friction coefficient, an aluminum plate was placed on a smooth glass plate, and a rear surface of the base film was bonded to the aluminum plate. Then, an aluminum plate having a load of 200 g was prepared as a weight. Subsequently, while the weight was in contact with the front surface of the base film, the weight was slid at a speed of 100 mm/min to measure a friction force. Thus, a dynamic friction coefficient when the weight was slid by 40 mm was calculated.

[Peel Strength]

A peel strength of the separable film from the base film was measured by a method according to JIS Z 0237:2009 "Testing methods of pressure-sensitive adhesive tapes and sheets." In measurement of the peel strength, a table-top precision universal tester (manufactured by Shimadzu Corporation, AGS-X 5 kN) was used. In measurement of the peel strength, a test piece having 25 mm width was cut from each examination marker. Then, the separable film was fixed to the table-top precision universal tester, and a strength at 180° peel of the base film from the separable film was calculated.

[Evaluation Results]

With reference to FIG. 17, the evaluation results will be described below. In FIG. 17, the arithmetic average roughness Ra of the base film refers to the arithmetic average roughness Ra on the front surface of the base film. On the other hand, the arithmetic average roughness Ra of the separable film refers to the arithmetic average roughness Ra on the surface to be coated of the separable film.

As shown in FIG. 17, with an increase in the arithmetic average roughness Ra of the surface to be coated of the separable film, the arithmetic average roughness Ra of the front surface of the base film increased. In the examination marker of Test Example 4-1, the arithmetic average roughness Ra of the front surface of the base film was less than 0.1, and the dynamic friction coefficient was more than 3. Further, in the examination marker of Test Example 4-1, when the front surface of the base film was scanned with the probe, it was found that the probe was caught on the front surface of the base film.

On the other hand, in the examination markers of Test Examples 4-2 to 4-7, the arithmetic average roughness Ra of the front surface of the base film was 0.1 or more, and the dynamic friction coefficient was 3 or less. Further, in the examination markers of Test Examples 4-2 to 4-7, when the front surface of the base film was scanned with the probe, it was found that the probe was not caught on the front surface of the base film.

In the examination marker of Test Example 4-7, which had the dynamic friction coefficient of 3.0 or less, it was found that the probe was not caught on the front surface of the base film when the front surface of the base film was scanned with the probe. However, since the examination marker of Test Example 4-7 had the peel strength of more than 0.3 N/25 mm, a large force was required to remove the separable film from the base film, which caused reduced ease of handling of the examination marker.

On the other hand, since the examination markers of Test Examples 4-2 to 4-6 had the peel strength of 0.3 N/25 mm or less, it was found that removal of the separable film from the base film was not difficult.

As described above, for smooth scan on the front surface of the base film with the probe, the front surface of the base film preferably has an arithmetic average roughness Ra of 0.1 μm or more, and a dynamic friction coefficient of 3.0 or less. In this case, the arithmetic average roughness Ra of the front surface of the base film can be 0.2 μm or more when the arithmetic average roughness Ra of the surface to be coated of the separable film, which corresponds to the front surface of the base film, is 0.3 μm or more.

In order to improve the ease of handling of the examination marker, the arithmetic average roughness Ra of the front surface of the base film is preferably less than 5.0. In this case, the arithmetic average roughness Ra of the surface to be coated of the separable film, which corresponds to the front surface of the base film, is preferably less than 7.0 μm.

As described above, according to the fourth embodiment of the examination marker, the following advantages can be obtained.

(4-1) When the front surface 11F of the base film 11 is scanned with a probe, the probe can smoothly move on the surface. Accordingly, the front surface 11F of the base film 11 can be smoothly scanned with the probe.

(4-2) Since the surface to be coated 13R of the separable film 13 has the arithmetic average roughness Ra of 0.2 μm or more, the possibility that the front surface 11F of the base film 11 has the arithmetic average roughness Ra of 0.1 μm or more increases.

(4-3) When the peel strength is 0.3 N/25 mm or less, removal of the separable film 13 from the base film 11 can be performed without difficulty. This increases ease of handling of the examination marker 10.

(4-4) Since the front surface 11F of the base film 11 has an arithmetic average roughness Ra of less than 5 μm, the possibility that the separable film 13 has a peel strength from the base film 11 of 0.3 N/25 mm or less increases.

(4-5) Since the surface to be coated 13R of the separable film 13 has the arithmetic average roughness Ra of less than 7 μm, the possibility that the front surface 11F of the base film 11 has an arithmetic average roughness Ra of less than 5 μm increases. Accordingly, removal of the separable film 13 from the base film 11 can be performed without difficulty.

[Modifications of Fourth Embodiment]

The fourth embodiment described above can be implemented with the following modifications.

[Base Film]

As long as the base film 11 in the examination marker 10 satisfies the above conditions 4-1 and 4-2, the synthetic resin for forming the base film 11 may be a resin other than polyurethane resin.

The base film 11 can be formed, not only by applying a coating liquid to the surface to be coated 13R of the separable film 13, but also by extrusion lamination onto the surface to be coated 13R of the separable film 13.

The front surface 11F of the base film 11 may also have the arithmetic average roughness Ra of 5 μm or more. In this case as well, advantages similar to the above (4-1) can be obtained as long as the base film 11 satisfies the above conditions 4-1 and 4-2.

[Adhesive Layer]

The adhesive for forming the adhesive layer 15 may be an adhesive other than urethane-based adhesives.

[Separable Film]

The separable film 13 may be omitted. In this case as well, advantages similar to the above (4-1) can be obtained as long as the base film 11 satisfies the above conditions 4-1 and 4-2.

As long as the base film 11 satisfies the above conditions 4-1 and 4-2, the surface to be coated 13R of the separable film 13 may have the arithmetic average roughness Ra of less than 0.2 μm. In this case as well, advantages similar to the above (4-1) can be obtained.

The surface to be coated 13R of the separable film 13 may also have the arithmetic average roughness Ra of 7 μm or more. In this case as well, advantages similar to the above (4-4) can be obtained as long as the base film 11 satisfies the above condition 4-5.

[Protective Film]

The protective film 14 may be omitted. In this case as well, advantages similar to the above (4-1) can be obtained as long as the base film 11 satisfies the above conditions 4-1 and 4-2.

[Examination Marker]

The peel strength of the separable film 13 from the base film 11 may be larger than 0.3 N/25 mm. In this case as well, advantages similar to the above (4-1) can be obtained as long as the base film 11 satisfies the above conditions 4-1 and 4-2.

In the examination marker 10, at least a portion other than the coordinate grid 12 in the laminate composed of the base film 11 and the adhesive layer 15 may have a total light transmittance of 50% or more. In this case, the coordinate grid 12 on the base film 11 can be visually observed when the separable film 13 is removed from the base film 11 and the protective film 14 is removed from the adhesive layer 15.

Further, in the examination marker 10, a portion other than the coordinate grid 12 in the laminate composed of the separable film 13, the base film 11, and the base film 15 may have a total light transmittance of 50% or more. In this case, the coordinate grid 12 on the base film 11 can be visually observed during adhesion of the examination marker 10 to the site to be examined regardless of whether the separable film 13 is removed from the base film 11.

Fifth Embodiment

With reference to FIGS. 2 and 18, a fifth embodiment of an examination marker will be described. In the fifth embodiment, the components common to those in the examination marker 10 of the first embodiment are denoted by the same reference signs as in the first embodiment, and detailed description thereof will be omitted. In the following description, an examination marker and test examples are each described.

[Examination Marker]

With reference to FIG. 2, an examination marker will be described.

As with the examination marker 10 of the first embodiment, the examination marker in the present embodiment is a marker for use in mammography, which is an example of diagnostic imaging using microwaves. The examination marker is a marker to be adhered to the breast, which is a site examined in mammography.

The examination marker 10 has the same structure as that of the second example of the examination marker 10 in the first embodiment, which was described earlier with reference to FIG. 2. The base film 11 is made of polyurethane resin. In the present embodiment, the adhesive layer 15 is made of a urethane-based adhesive. The adhesive layer 15 is laminated on the base film 11.

The examination marker 10 of the present embodiment satisfies the following three conditions.

(Condition 5-1) The peel strength of the adhesive layer 15 from a stainless test plate in accordance with JIS Z 0237: 2009 is 1.5 N/25 mm or more and 6.0 N/25 mm or less.

(Condition 5-2) The breaking strength of the base film 11 in accordance with JIS K 7127 is higher than the peel strength of the adhesive layer 15.

(Condition 5-3) The water vapor transmission rate of the laminate composed of the base film 11 and the adhesive layer 15 in accordance with JIS Z 0208 is 750 $g/m^2 \cdot day$ or more under the conditions of 40° C. and 90% RH.

According to the examination marker 10, due to the peel strength of the adhesive layer 15 being 6.0 N/25 mm or less, it is possible to prevent residue of the adhesive layer 15 on the breast. Further, since the breaking strength of the base film 11 is higher than the peel strength of the adhesive layer 15, tearing of the base film 11 is not likely to occur. Accordingly, the burden on the subject and the operator can be reduced. On the other hand, since the water vapor transmission rate of the laminate composed of the base film 11 and the adhesive layer 15 in accordance with JIS Z 0208 is 750 $g/m^2 \cdot day$ or more under the conditions of 40° C. and 90% RH, sweating of the breast can be suppressed. Further, since the peel strength of the adhesive layer 15 is 1.5 N/25 mm or more, the adhesive layer 15 can be adhered to the breast while filling the level difference between the breast surface and the raised nipple, that is, unevenness formed by the breast surface and the nipple. Accordingly, the accuracy of examination can be improved.

Further, since the adhesive layer 15 is made of a urethane-based adhesive, which is a synthetic resin having high permeability, sweating at the site to be examined where the adhesive layer 15 is adhered can be suppressed.

The polyurethane resin for forming the base film 11 can include at least one selected from the group consisting of ether-based polyurethane resin, ester-based polyurethane resin, and carbonate-based polyurethane resin. The base film 11 is preferably made of an ether-based polyurethane resin. The ether-based polyurethane resin when used to form the base film 11 can increase the water vapor transmission rate of the base film 11.

The base film 11 preferably has a thickness of 20 μm or less. Accordingly, occurrence of wrinkling in the base film 11 due to the base film 11 being excessively thick can be prevented when the base film 11 is adhered to the breast. Further, the base film 11 preferably has a thickness of 8 μm or more. Accordingly, occurrence of wrinkling in the base film 11 due to the base film 11 being excessively thin can be prevented when the base film 11 is adhered to the breast.

The base film 11 preferably has a breaking strength of 6.3 N/25 mm or more and 10.4 N/25 mm or less. Accordingly, the thickness of the base film 11 can be within a range that enables a high water vapor transmission rate while preventing the base film 11 from being easily torn compared with the base film 11 having the breaking strength of more than 10.4 N/25 mm.

The base film 11 is transparent or translucent. In the base film 11, the total light transmittance according to JIS K 7361-1 is preferably 30% or more, and more preferably 50% or more.

The adhesive layer 15 is transparent or translucent. The adhesive layer 15 preferably has a total light transmittance of 30% or more, and more preferably 50% or more.

A portion of the examination marker 10 other than the coordinate grid 12 preferably has a total light transmittance according to JIS K 7361-1 of 30% or more, and more preferably 50% or more.

TEST EXAMPLES

With reference to FIG. 18, test examples of the examination marker will be described.

Test Example 5-1

A 75-μm thick protective film (manufactured by Toray Advanced Film Co., Ltd., Cerapeel BX-9) (Cerapeel is a registered trademark) was prepared. A urethane-based adhesive (manufactured by Toyochem Co., Ltd., CYABINE SP-205) (CYABINE is a registered trademark) as a base resin, and a curing agent (manufactured by Toyochem Co., Ltd., T-501B) were prepared. The curing agent was added to the urethane-based adhesive so that the ratio of the number of moles of the isocyanate groups contained in the curing agent to the number of moles of the hydroxyl groups contained in the base resin (number of moles of isocyanate groups/number of moles of hydroxyl groups) (hereinafter, also referred to as a molar ratio between the base resin and the curing agent) becomes 0.13, and the mixture was stirred to prepare a coating liquid. Then, the coating liquid was applied to the protective film by gravure coating, and the urethane-based adhesive was dried. Thus, an adhesive layer having a thickness of 10 μm was obtained. An 8-μm thick urethane film (manufactured by Okura Industrial Co., Ltd, Silklon HVL85SW) (Silklon is a registered trademark) was prepared as a base film. Then, the base film was bonded to the adhesive layer, and left standing at 50° C. for 3 days. Thus, an examination marker of Test Example 5-1 was prepared.

Test Example 5-2

An examination marker of Test Example 5-2 was obtained in the same manner as in Test Example 5-1 except that the molar ratio between the base resin and the curing agent in Test Example 5-1 was changed to 0.19.

Test Example 5-3

An examination marker of Test Example 5-3 was obtained in the same manner as in Test Example 5-1 except that the thickness of the adhesive layer in Test Example 5-1 was changed to 20 μm.

Test Example 5-4

An examination marker of Test Example 5-4 was obtained in the same manner as in Test Example 5-2 except that the thickness of the adhesive layer in Test Example 5-2 was changed to 20 μm.

Test Example 5-5

A polypropylene (PP) laminate release paper (manufactured by Lintec Corporation, EV130TPD) was prepared as a separable film. Then, an aqueous polyurethane containing ether-based polyol (manufactured by Mitsui Chemicals, Inc., TAKELAC WS-6021) (TAKELAC is a registered trademark) was applied and dried. Subsequently, the dried layer was left at room temperature for aging for 2 days to thereby obtain a base film having a thickness of 10 μm. An examination marker of Test Example 5-5 was obtained by adhering the adhesive layer, prepared in the same manner as in Test Example 5-1 except that the thickness was changed to 15 μm, to the base film.

Test Example 5-6

An examination marker of Test Example 5-6 was obtained in the same manner as in Test Example 5-5 except that the thickness of the base film in Test Example 5-5 was changed to 15 μm.

Test Example 5-7

An examination marker of Test Example 5-7 was obtained in the same manner as in Test Example 5-6 except that the thickness of the adhesive layer in Test Example 5-6 was changed to 20 μm and the molar ratio between the base resin and the curing agent was changed to 0.03.

Test Example 5-8

The base resin in Test Example 5-1 was replaced by an acrylic adhesive (manufactured by Nihon Gosei Kako Co., Ltd., COPONYL 8065) (COPONYL is a registered trademark), and a curing agent (manufactured by Tosoh Corporation, Coronate L-55E) (Coronate is a registered trademark) was prepared. Then, an examination marker of Test Example 5-8 was obtained in the same manner as in Test Example 5-1 except that the molar ratio between the base resin and the curing agent was changed to 0.15.

Test Example 5-9

An examination marker of Test Example 5-9 was obtained in the same manner as in Test Example 5-1 except that the molar ratio between the base resin and the curing agent in Test Example 5-1 was changed to 0.25.

Test Example 5-10

An examination marker of Test Example 5-10 was obtained in the same manner as in Test Example 5-1 except that a 30-μm thick PU film (manufactured by Nihon Matai Co., Ltd., Esmer URS) (Esmer is a registered trademark) was prepared as a base film.

Test Example 5-11

An examination marker of Test Example 5-11 was obtained in the same manner as in Test Example 5-1 except that an acrylic adhesive (manufactured by Nihon Gosei Kako Co., Ltd., COPONYL N-4181) as a base resin and a curing agent (manufactured by Tosoh Corporation, Coronate L-55E) were prepared, and the thickness of the adhesive layer was changed to 20 μm.

Test Example 5-12

An examination marker of Test Example 5-12 was obtained in the same manner as in Test Example 5-7 except that the molar ratio between the base resin and the curing agent in Test Example 5-7 was changed to 0.01.

Test Example 5-13

A water transfer tattoo sticker (manufactured by 3M Japan Ltd., transfer sticker, product number: 51112) was prepared. A transparent glue film composed of a PVA layer having a 5 μm thickness, and a separator having a 110 μm thickness and supporting the PVA layer was prepared. The separator was removed from the transparent adhesive film to obtain the PVA layer, which was used as a base film. Then, an examination marker of Test Example 5-13 was obtained by adhering the adhesive layer, prepared in the same manner as in Test Example 5-1, to the base film.

[Evaluation Method]
[Breaking Strength]

In accordance with the method according to JIS K 7127 "Plastics—Determination of tensile properties—Part 3: Test conditions for films and sheets," a breaking strength was measured. In measurement of the breaking strength, each examination marker was cut into a dumbbell shape with the narrow part having the width of 6 mm (test piece type 1B). A tensile elongation at break was measured by using a tensile tester. The test rate was set to 300 mm/min and the gauge length $L_0$ was set to 25 mm to measure a tensile load at break. The measured tensile load was multiplied by 25/6 to thereby calculate a breaking strength when the width of the adhesive layer is 25 mm. In measurement of the tensile elongation at break, the laminate composed of only the base film and the adhesive layer was used.

[Peel Strength]

A peel strength of the examination marker was measured by a method according to JIS Z 0237:2009 "Testing methods of pressure-sensitive adhesive tapes and sheets." Each examination marker was formed into a sample having a width of 25 mm. After the protective film was removed from the adhesive layer, the adhesive layer was adhered to a stainless test plate. Then, a 2 kg weight roller was rolled on the sample, reciprocating twice to apply a load to the sample, and the sample was left standing for 30 minutes or longer. Subsequently, the peel strength when the peel rate was 300 mm/min and the sample was peeled from the stainless test plate at 180° was measured by using a tensile tester.

[Water Vapor Transmission Rate]

The water vapor transmission rate of the examination marker was measured in accordance with the method according to JIS Z 0208 "Testing methods for determination of the water vapor transmission rate of moisture-proof packaging materials (dish method)." In measurement of the water vapor transmission rate, calcium chloride (anhydrous) was weighed as a moisture absorbent. Then, the initial weight of a permeability cup including the moisture absorbent was measured by using an electronic scale. After the examination marker was left standing in an environment of 40° C. and 90% RH for 2 hours, the permeability cup was weighed. Then, a gain in weight of the permeability cup was determined as the amount of water vapor transmitted.

[Adhesion Suitability]

Adhesion suitability of the examination marker was evaluated by using a breast cancer palpation training model (manufactured by Tanac Co., Ltd.). The examination marker was adhered to the model breast, the following three items were evaluated.

(Item 1) Wrinkling in the examination marker
(Item 2) Lifting of the examination marker
(Item 3) Resistance of examination marker to being torn For the item 1, whether the examination marker showed wrinkling when the examination marker was adhered to the breast was evaluated in two grades as below.

Good: No wrinkling occurred, or fine wrinkles were found, which did not affect the examination
Poor: Large wrinkles to a degree that affected the examination were found For the item 2, whether the examination marker was partially lifted from the nipple when the examination marker was adhered to the breast was evaluated in two grades as below.

Good: No Lifting occurred, or the examination marker was lifted due to a raised part of the nipple, which did not affect the examination
Poor: The examination marker was lifted significantly from the nipple to a degree that affected the examination For the item 3, the examination marker was subjected to an operation in which the examination marker was adhered to the breast, then removed from the breast, and then again adhered to the breast. The results were evaluated in three grades as below.

Excellent: The base film was not torn even when the examination marker was rapidly removed from the breast
Good: The base film was not torn when the examination marker was slowly removed from the breast
Poor: The base film was torn even when the examination marker was slowly removed from the breast

[Adhesive Residue]

An adhesive layer used for the examination marker was formed on a support made of a 12-μm thick PET film. The adhesive layer was adhered to the subject body, and left standing for 30 minutes or more. Then, the adhesive layer was peeled from the subject body at 180° by using a tensile tester. The peel rate was set at 300 mm/min. Whether adhesive residue was present when the adhesive layer was removed from the subject body, that is, whether part of the adhesive layer was left on the subject body was evaluated in two grades as below.

Good: No adhesive residue was present
Poor: Part of adhesive layer failed to be removed and residue was present on the subject body

[Degree of Sweating]

Each examination marker was adhered to the subject body, and left standing for 30 minutes or more. Then, whether sweating occurred at the site where the examination marker was adhered was checked. The degree of sweating was evaluated in three grades as below.

Excellent: No sweating occurred
Good: Sweating occurred to a degree that did not affect examination using microwaves
Poor: Sweating occurred to a degree that caused noise in the result of examination using microwaves

[Evaluation Results]

With reference to FIG. 18, the evaluation results will be described below.

As shown in FIG. 18, according to the adhesive layer made of a polyurethane resin having high water vapor transmission rate, it was found that the laminate composed of the base film and the adhesive layer kept a high water vapor transmission rate. Specifically, the laminate including the adhesive layer made of a polyurethane resin kept the water vapor transmission rate of 750 g/m²·day or more. When the laminate had the water vapor transmission rate of 750 g/m²·day or more, sweating occurred to a degree that did not affect examination using microwaves. Further, when the laminate had a water vapor transmission rate of 850 g/m²·day or more, no sweating occurred.

In Test Examples 5-9 and 5-10, in which the adhesive layer has a peel strength of 1.2 N/25 mm or less, it was found that the examination marker was lifted due to the level difference between the nipple and the breast surface since it had insufficient adhesion to an uneven surface even when an adhesive layer was made of a polyurethane resin. On the other hand, in Test Example 5-4, in which the adhesive layer has a peel strength of 1.6 N/25 mm or more, it was found that lifting of the laminate was reliably prevented. As seen from the above results, the adhesive layer preferably has a peel strength of 1.5 N/25 mm or more in order to prevent itself from being lifted due to the level difference between the nipple and the breast surface.

However, in Test Example 5-12, in which the adhesive layer had a peel strength of 7.2 N/25 mm, adhesion to the subject body was excessively high. As a result, adhesive residue was present when the adhesive layer was removed from the subject body. On the other hand, in Test Example 5-11, in which the adhesive layer had a peel strength of 5.4 N/25 mm or less, no adhesive residue was present. Therefore, the adhesive layer preferably has a peel strength of the 6.0 N/25 mm or less in order to prevent the adhesive residue.

As described above, in order to prevent lifting of the laminate composed of the base film and the adhesive layer, while preventing adhesive residue of the adhesive layer, the adhesive layer preferably has a peel strength of 1.5 N/25 mm or more and 6.0 N/25 mm or less.

In addition, a positive correlation was found between the thickness of the base film and the breaking strength of the base film. As in Test Examples 5-5 to 5-7, in order to prevent tearing of the base film during removal of the base film, the breaking strength is preferably larger than the peel strength, and a larger difference between the breaking strength and the peel strength is more preferred. However, as in Test Example 5-10, when the base film was excessively thick and thus the base film itself had excessively high rigidity, wrinkling was likely to occur in the base film when the base film was adhered. Further, when the base film has excessively high rigidity, the base film deforms when it is removed, and the deformation of the base film remains even after the force applied to the base film is released. In this sense, the thickness of the base film is preferably less than 30 μm, and more preferably 20 μm or less.

To the contrary, as in Test Example 5-13, when the base film was excessively thin, wrinkling was also likely to occur in the base film when the base film was adhered. Therefore, the thickness of the base film is preferably more than 5 μm, and more preferably more than 8 μm.

Further, as in Test Examples 5-1 to 5-8, when the base film had a breaking strength of 6.3 N/25 mm or more and 10.4 N/25 mm or less, the thickness of the base film can be within a range that can prevent the base film from being easily torn and maintain a high water vapor transmission rate of the base film.

As described above, according to the fifth embodiment of the examination marker, the following advantages can be obtained.

(5-1) Due to the peel strength of the adhesive layer 15 being 6.0 N/25 mm or less, it is possible to prevent residue of the adhesive layer 15 from remaining on the breast B. Further, since the breaking strength of the base film 11 is higher than the peel strength of the adhesive layer 15, tearing of the base film 11 is not likely to occur. Accordingly, the burden on the subject and the operator can be reduced.

(5-2) Since the laminate composed of the base film 11 and the adhesive layer 15 has a water vapor transmission rate of 750 g/m²·day or more, sweating of the breast B can be suppressed. Further, due to the peel strength of the adhesive layer 15 of 1.5 N/25 mm or more, the adhesive layer 15 can be adhered to the breast B while filling the level difference in the breast B, that is, unevenness of the surface of the breast B. Accordingly, the accuracy of examination can be improved.

(5-3) Since the adhesive layer 15 is made of a urethane-based adhesive, which is a synthetic resin having high water vapor transmission rate, sweating of the breast B can be suppressed.

(5-4) Since the base film 11 has a thickness of 20 μm or less, occurrence of wrinkling in the base film 11 due to the base film 11 being excessively thick can be prevented when the base film 11 is adhered to the breast B.

(5-5) Since the base film 11 has a thickness of 8 μm or more, occurrence of wrinkling in the base film 11 due to the base film 11 being excessively thin can be prevented when the base film 11 is adhered to the breast B.

(5-6) When the base film 11 is made of an ether-based polyurethane resin, the water vapor transmission rate of the base film 11 can be improved.

(5-7) When the base film 11 has a breaking strength of 6.3 N/25 mm or more and 10.4 N/25 mm or less, the thickness of the base film 11 can be within a range that enables a high water vapor transmission rate while preventing the base film 11 from being easily torn compared with a base film 11 having a breaking strength of more than 10.4 N/25 mm.

[Modifications of Fifth Embodiment]

The fifth embodiment described above can be implemented with the following modifications.

[Base Film]

The base film 11 may also be made of a polyurethane resin other than ether-based polyurethane resin. The base film 11 may be made of, for example, an ester-based polyurethane resin or a carbonate-based polyurethane resin.

As long as the laminate composed of the base film 11 and the adhesive layer 15 in the examination marker 10 satisfies the above conditions 5-1 to 5-3, the synthetic resin for forming the base film 11 may be a resin other than polyurethane resin.

The base film 11 may have a thickness of larger than 20 μm, or smaller than 8 μm. In this case as well, advantages similar to the above (5-1) and (5-2) can be obtained as long as the examination marker 10 satisfies the above conditions 5-1 to 5-3.

The breaking strength of the base film 11 may be less than 6.3 N/25 mm, or may be more than 10.4 N/25 mm. In this case as well, advantages similar to the above (5-1) and (5-2) can be obtained as long as the examination marker 10 satisfies the above conditions 5-1 to 5-3.

[Adhesive Layer]

The adhesive for forming the adhesive layer 15 may be an adhesive other than urethane-based adhesives. For example, as in Test Example 5-8, the adhesive for forming the adhesive layer 15 may be an acrylic adhesive. In this case as well, advantages similar to the above (5-1) and (5-2) can be obtained as long as the examination marker 10 satisfies the above conditions 5-1 to 5-3.

[Separable Film]

The separable film 13 may be omitted. In this case as well, advantages similar to the above (5-1) and (5-2) can be obtained as long as the examination marker 10 includes the base film 11 that satisfies the above conditions 5-1 to 5-3 and the adhesive layer 15.

[Protective Film]

The protective film 14 may be omitted. In this case as well, advantages similar to the above (5-1) and (5-2) can be obtained as long as the examination marker 10 includes the base film 11 that satisfies the above conditions 5-1 to 5-3 and the adhesive layer 15.

[Examination Marker]

In the examination marker 10, at least a portion other than the coordinate grid 12 in the laminate composed of the base film 11 and the adhesive layer 15 may have a total light transmittance of 50% or more. In this case, the coordinate grid 12 on the base film 11 can be visually observed when the separable film 13 is removed from the base film 11 and the protective film 14 is removed from the adhesive layer 15.

Further, in the examination marker 10, a portion other than the coordinate grid 12 in the laminate composed of the separable film 13, the base film 11, and the base film 15 may have a total light transmittance of 50% or more. In this case, the coordinate grid 12 on the base film 11 can be visually observed in adhesion of the examination marker 10 to the site to be examined regardless of whether the separable film 13 is removed or not removed from the base film 11.

The technical idea derived from the above embodiments will be further described below.

[Supplementary Note 5-1]

A method for producing an examination marker which includes a base film, and an adhesive layer laminated on the base film, the method comprising a step of forming the adhesive layer, wherein the step of forming the adhesive layer includes mixing a base resin having a urethane skeleton as a main chain, which has at least two ends, and a hydroxyl group on each end of the main chain, and a curing agent having a urethane skeleton as a main chain, which has at least two ends, and an isocyanate group on each end of the main chain, in which a ratio of the number of moles of the isocyanate groups to the number of moles of the hydroxyl groups is 0.02 or more and 0.2 or less.

(5-8) According to the above configuration, the peel strength of the adhesive layer can be sufficiently large to follow the uneven surface of the site to be examined and fill the level difference, that is, unevenness in the site to be examined, and sufficiently small to prevent residue of the adhesive layer from remaining at the site to be examined when the adhesive layer is removed from the site to be examined.

Sixth Embodiment

With reference to FIGS. 2 and 19, a sixth embodiment of an examination marker will be described. In the sixth embodiment, components common to those in the examination marker 10 of the first embodiment are denoted by the same reference signs as in the first embodiment, and detailed description thereof will be omitted. In the following description, an examination marker and test examples are each described.

[Examination Marker]

With reference to FIG. 2, an examination marker will be described. As with the examination marker 10 of the first embodiment, the examination marker in the present embodiment is a marker for use in mammography, which is an example of diagnostic imaging using microwaves. The examination marker is a marker to be adhered to the breast, which is a site examined in mammography.

The examination marker 10 has the same structure as that of the second example of the examination marker 10 in the first embodiment, which was described earlier with reference to FIG. 2. In the examination marker 10 of the present embodiment, a laminate composed of the base film 11 and the adhesive layer 15 satisfies two conditions described below.

(Condition 6-1) The tensile elongation at break is 130% or more.

(Condition 6-2) The tensile stress at 100% elongation is 10 MPa or less.

Further, the base film 11 in the examination marker 10 satisfies the following condition.

(Condition 6-3) The peel strength of the base film 11 from a stainless plate on a side opposite to that on which the adhesive layer 15 is formed is 3.5 N/25 mm or less.

According to the examination marker 10, since the laminate has the tensile elongation at break of 130% or more and the tensile stress at 100% elongation of 10 MPa or less, the laminate composed of the base film 11 and the adhesive layer 15 can be stretched to a large extent with a small force. In addition, while the laminate maintains high flexibility as described above since the base film 11 has a peel strength of 3.5 N/25 mm or less, it is possible to separate a portion of the laminate from another portion when they are in contact with each other by applying a force in a direction that separates the contact portions. As described above, due to the flexibility of the laminate, the laminate can easily follow the breast and be adhered thereto, and portions of the laminate that are in contact with each other can be easily separated. Thus, the examination marker 10 can be easily handled.

The tensile elongation at break is calculated in accordance with JIS K7127:1999 (ISO 527-3:1995) "Plastics—Determination of tensile properties—Part 3: Test conditions for films and sheets" and JIS K7161-1:2014 (ISO 527-1:2012) "Plastics—Determination of tensile properties—Part 1: General principles." When a test piece as an object to be measured does not have a yield point, the "tensile strain at break" defined in section 3.7.2 of JIS K7161-1:2014 is calculated as a tensile elongation at break. On the other hand, when a test piece has a yield point, the "nominal tensile strain at break" defined in the section 3.8.1 of the above standard is calculated as a tensile elongation at break. In addition, the tensile strain at break is calculated according to the formula (1) as below specified in the "Calculation and expression of test results" in the section 10 of the above standard. Further, the nominal tensile strain at break is calculated according to the formula (2) as below specified in the "Calculation and expression of test results" in the section 10 of the above standard.

$$\varepsilon = \Delta L_0/L_0 \qquad \text{formula (1)}$$

$$\varepsilon_t = \varepsilon_y + \Delta L_t/L \qquad \text{formula (2)}$$

In formula (1), ε is a strain (%), $L_0$ is a gauge length of the test piece (mm), and $\Delta L_0$ is an increased amount in the gauge length of the test piece (mm). Further, in formula (2), $\varepsilon_t$ is a nominal strain (%), $\varepsilon_y$ is a yield strain (%), L is an initial distance between the fixation tools (mm), $\Delta L_t$ is an increased amount in the distance between the fixation tools from the yield point (mm).

The tensile stress at 100% elongation is in accordance with JIS K7127:1999 (ISO 527-3:1995) "Plastics—Determination of tensile properties—Part 3: Test conditions for films and sheets," and calculated as a stress when the strain reaches a predetermined value (100%) in the "tensile stress at x % strain" defined in the section 3.6.3 of JIS K7161-1: 2014 (ISO 527-1:2012) "Plastics—Determination of tensile properties—Part 1: General principles." In addition, the tensile stress at 100% strain is calculated according to formula (3) as below specified in the "Calculation and expression of test results" in the section 10 of the above standard.

$$\sigma = F/A \qquad \text{formula (3)}$$

In formula (3), σ is a stress (MPa), F is a magnitude of the measured force (N), and A is an initial cross sectional area of the test piece (mm²).

The peel strength is measured by a method in accordance with JIS Z0237:2009 "Testing methods of pressure-sensitive adhesive tapes and sheets." The peel strength is measured in accordance with "Method 1: 180° peel adhesion from test plate" in the section 10.4.1 of the above standard.

The base film 11 is made of a polyurethane resin. The polyurethane resin preferably includes at least one selected from the group consisting of ether-based polyurethane resin, ester-based polyurethane resin, and carbonate-based polyurethane resin. Accordingly, the base film 11 can be provided with high flexibility and easily adhered to the site to be examined.

The ether-based polyurethane resin is a polyurethane resin produced using an ether-based polyol containing an ether bond (—O—). The ester-based polyurethane resin is a polyurethane resin produced using an ester-based polyol containing an ester bond (—COO—). The carbonate-based polyurethane resin is a polyurethane resin produced using a polyol containing a carbonate bond (—OC(═O)O—). The base film 11 preferably has a thickness of 5 μm or more and 30 μm or less.

The polyurethane resin can include a first polyurethane resin and a second polyurethane resin. The first polyurethane resin has a glass transition temperature lower than a glass transition temperature of the second polyurethane resin. Since the two polyurethane resins included in the polyurethane resin for forming the base film 11 have different glass transition temperatures, both flexibility and low adhesion can be achieved in the base film 11. Of the polyurethane resins for forming the base film 11, the first polyurethane resin having a lower glass transition temperature tends to mainly provide the flexibility to the base film 11, while the second polyurethane resin having a higher glass transition temperature tends to mainly provide the low adhesion to the base film 11.

The glass transition temperature of the first polyurethane resin can be 40° C., and the glass transition temperature of the second polyurethane resin can be 90° C. Accordingly, due to a large difference between the glass transition temperature of the first polyurethane resin and the glass transition temperature of the second polyurethane resin, the base film can exhibit both the flexibility and low adhesion.

The examination marker 10 is typically used in an environment held at room temperature, that is, around 20° C. In this case, a difference between the glass transition temperature of the first polyurethane resin and the environmental temperature is small, and the glass transition temperature of the second polyurethane resin is significantly higher than the environmental temperature. Accordingly, the first polyurethane resin can increase the flexibility of the base film, while the second polyurethane resin can weaken the adhesion of the base film.

A ratio (P2/P1) of a first mass (P1) of the first polyurethane resin to a second mass (P2) of the second polyurethane resin is preferably 1/25 or more and 1/5 or less. Accordingly, due to the ratio of the first mass to the second mass, the base film 11 can exhibit tensile elongation at break and tensile stress at 100% elongation that enable high flexibility, and peel strength that enables low adhesion.

The adhesive layer 15 is made of a synthetic resin adhesive. The adhesive layer 15 is preferably made of a urethane-based adhesive. When the adhesive layer 15 is made of a urethane-based adhesive, the adhesive layer 15 preferably has a thickness of 5 μm or more and 25 μm or less.

The separable film 13 and the protective film 14 are preferably made of a transparent or translucent synthetic resin film.

The separable film 13 preferably has a hardness higher than a hardness of the base film 11. Accordingly, when a portion of the separable film 13 comes into contact with another portion, the contact portions can be prevented from being adhered to each other.

As described above, since the laminate satisfies the conditions 6-1 and 6-2, the laminate is stretched to a large extent compared to a force applied to the laminate. Accordingly, the laminate has high conformability to the shape of the breast B, and wrinkling is not likely occur in the laminate. In addition, since the base film 11 satisfies the condition 6-3, even when a portion of the base film 11 comes into contact with another portion, or when a portion of the adhesive layer 15 comes into contact with another portion when the laminate is stretched, it is possible to separate the contact portions. Therefore the examination marker 10 including the laminate composed of the base film 11 and the adhesive layer 15, which has high flexibility and low adhesion, can increase efficiency of mammography examination.

TEST EXAMPLES

With reference to FIG. 19, test examples will be described.

Test Example 6-1

A 75-μm thick PET film provided with a release layer (manufactured by Toray Advanced Film Co., Ltd., Cerapeel BX-9) (Cerapeel is a registered trademark) was prepared as a separable film. Then, an aqueous polyurethane containing ether-based polyol (manufactured by Mitsui Chemicals, Inc., TAKELAC WS-6021) (TAKELAC is a registered trademark) was applied and dried. Subsequently, the dried layer was left at room temperature for aging for 2 days to thereby obtain a base film having a thickness of 10 μm.

Then, a 38-μm thick PET film provided with a release layer (manufactured by Toray Advanced Film Co., Ltd., Cerapeel WZ) was prepared as a protective film. 1% of a curing agent (manufactured by Toyochem Co., Ltd., T-501B) was added to a urethane-based adhesive (manufactured by Toyochem Co., Ltd., SP-205), and the mixture was stirred to prepare a coating liquid. Then, the coating liquid was applied to the protective film by gravure coating, and the urethane-based adhesive was dried. Thus, an adhesive layer having a thickness of 20 µm was obtained. Then, the base film was bonded to the adhesive layer to obtain a laminate. The laminate was aged in an environment of 40° C. to obtain an examination marker of Test Example 6-1.

Test Example 6-2

As the first polyurethane resin, an aqueous polyurethane having a glass transition temperature of 40° C. and containing ether-based polyol (manufactured by Mitsui Chemicals, Inc., TAKELAC WS-6021) was prepared. As the second polyurethane resin, an aqueous polyurethane having a glass transition temperature of 90° C. and containing ether-based polyol (manufactured by Mitsui Chemicals, Inc., TAKELAC W-6020) was prepared. Then, the first polyurethane resin was mixed with the second polyurethane resin so that a ratio of the mass of the second polyurethane resin to the mass of the first polyurethane resin is 1/25. An examination marker of Test Example 6-2 was obtained in the same manner as in Test Example 6-1 except that the polyurethane resin obtained by mixing the first polyurethane resin with the second polyurethane resin was used in Test Example 6-1.

Test Example 6-3

An examination marker of Test Example 6-3 was obtained in the same manner as in Test Example 6-2 except that the ratio of the mass of the second polyurethane resin to the mass of the first polyurethane resin in Test Example 6-2 was changed to 1/12.5.

Test Example 6-4

An examination marker of Test Example 6-4 was obtained in the same manner as in Test Example 6-2 except that the ratio of the mass of the second polyurethane resin to the mass of the first polyurethane resin in Test Example 6-2 was changed to 1/10.

Test Example 6-5

An examination marker of Test Example 6-5 was obtained in the same manner as in Test Example 6-2 except that the ratio of the mass of the second polyurethane resin to the mass of the first polyurethane resin in Test Example 6-2 was changed to 1/5.

Test Example 6-6

An examination marker of Test Example 6-6 was obtained in the same manner as in Test Example 6-2 except that the ratio of the mass of the second polyurethane resin to the mass of the first polyurethane resin in Test Example 6-2 was changed to 1/2.

Test Example 6-7

An examination marker of Test Example 6-7 was obtained in the same manner as in Test Example 6-2 except that the mass of the first polyurethane resin and the mass of the second polyurethane resin in Test Example 6-2 were equal.

Test Example 6-8

An examination marker of Test Example 6-8 was obtained in the same manner as in Test Example 6-2 except that the ratio of the mass of the second polyurethane resin to the mass of the first polyurethane resin in Test Example 6-2 was changed to 5/1.

Test Example 6-9

An examination marker of Test Example 6-9 was obtained in the same manner as in Test Example 6-2 except that the ratio of the mass of the second polyurethane resin to the mass of the first polyurethane resin in Test Example 6-2 was changed to 10/1.
[Evaluation Method]
[Tensile Elongation at Break]

The tensile elongation at break was measured in accordance with JIS K7127:1999 (ISO 527-3:1995) "Plastics—Determination of tensile properties—Part 3: Test conditions for films and sheets" and JIS K7161-1:2014 (ISO 527-1:2012) "Plastics—Determination of tensile properties—Part 1: General principles." In measurement of the tensile elongation at break, the examination marker was cut into a dumbbell shape (test piece type 5), and a tensile elongation at break was measured by using a tensile tester (manufactured by Shimadzu Corporation, AGS-X 5 kN). The test rate was set to 300 mm/min, the gauge length $L_0$ was set to 25 mm, and the initial distance between the fixation tools L was set to 80 mm. When the test piece did not have a yield point, the tensile strain at break was calculated as a tensile elongation at break. On the other hand, when the test piece had a yield point, the nominal tensile strain at break was calculated as a tensile elongation at break. In measurement of the tensile elongation at break, the laminate composed of only the base film and the adhesive layer was used.
[Tensile Stress at 100% Elongation]

As in measurement of the tensile elongation at break, the test piece was prepared in accordance with JIS K7127:1999 (ISO 527-3:1995) "Plastics—Determination of tensile properties—Part 3: Test conditions for films and sheets." Then, the tensile stress at 100% elongation was calculated as a stress when the strain reaches 100% in accordance with JIS K7161-1:2014 (ISO 527-1:2012) "Plastics—Determination of tensile properties—Part 1: General principles."
[Adhesion Suitability]

Adhesion suitability of the examination marker was evaluated by using a breast cancer palpation training model (manufactured by Tanac Co., Ltd.). The examination marker was adhered to the model breast, and whether wrinkling occurred in the examination marker was evaluated in three grades as below. In the three grades, an examination marker evaluated as "good" or "fair" was determined as an examination marker having adhesion suitability.
  Good: No wrinkling occurred
  Fair: Fine wrinkles were found, which did not affect the examination
  Poor: Large wrinkles to a degree that affected the examination were found
[Peel Strength]

The peel strength was measured by a method in accordance with JIS Z0237:2009 "Testing methods of pressure-sensitive adhesive tapes and sheets." In measurement of the peel strength, a table-top precision universal tester (manufactured by Shimadzu Corporation, AGS-X 5 kN) and an SUS 304 plate having a BA surface finish were used. A test piece having 25 mm width was formed from the examination marker. Then, a surface of the base film on a side opposite to that on which the adhesive layer was laminated was placed on the SUS plate, and the base film was pressure bonded to the SUS plate by using a 2 kg rubber roller. Next, the test rate was set to 300 mm/min, and the test piece was peeled from the SUS plate at 180°.

[Handling Suitability]

In the laminate composed of the base film and the adhesive layer, when a portion of the base film, referred to as a first portion, is overlapped with another portion, referred to as a second portion, whether the contact portions of the base film are adhered to each other was evaluated in three grades as below. In the three grades, the examination marker evaluated as "good" or "fair" was determined as the examination marker having handling suitability.

Good: The first portion and the second portion were not adhered to each other.

Fair: Although the first portion and the second portion were adhered to each other, the second portion was able to be separated from the first portion without tearing the base film.

Poor: The first portion and the second portion were adhered to each other, and the base film was torn when the second portion was being separated from the first portion.

[Evaluation Results]

With reference to FIG. 19, the evaluation results will be described below.

As shown in FIG. 19, all the examination markers of Test Examples 6-1 to 6-9 had the tensile elongation at break of 130% or more. Further, the examination markers of Test Examples 6-1 to 6-5 had the tensile stress at 100% elongation of 10 MPa or less. On the other hand, the examination markers of Test Examples 6-6 to 6-9 had the tensile stress at 100% elongation of more than 10 MPa. Moreover, in the adhesion suitability evaluation, the examination markers of Test Examples 6-1 to 6-4 were evaluated as "Good," the examination marker of Test Example 6-5 was evaluated as "Fair," and the examination markers of Test Examples 6-6 to 6-9 were evaluated as "Poor."

As described above, the examination markers in Test Examples 6-1 to 6-4, which had high tensile elongation at break of 440% or more and low tensile stress at 100% elongation of 4.2 MPa or less, were found to have high adhesion suitability. Further, the examination marker in Test Example 6-5, which had high tensile elongation at break of 450%, had the tensile stress at 100% elongation of 10 MPa or less, which was high compared to the examination markers in Test Examples 6-1 to 6-4. Accordingly, the laminate showed wrinkling to a degree that did not affect the examination. On the other hand, the examination markers in Test Examples 6-6 to 6-9, which had high tensile elongation at break of 330% or more, had high tensile stress at 100% elongation of more than 10 MPa. Accordingly, in Test Examples 6-6 to 6-9, a large force is required to stretch the examination marker. Therefore, it seems difficult to adhere the laminate to the breast without causing wrinkles.

Furthermore, in Test Example 6-1, in which the examination marker had high peel strength of 3.6 N/25 mm, the base film was torn when the second portion of the base film was being separated from the first portion. On the other hand, in Test Examples 6-2 to 6-9, in which the examination markers had low peel strength of 2.2 N/25 mm or less, the second portion of the base film was able to be separated from the first portion.

As described above, it was found that both the adhesion suitability and the handling suitability of the examination marker were improved when the tensile elongation at break was 130% or more, the tensile stress at 100% elongation was 10 MPa or less, and the peel strength was 3.5 N/25 mm or less.

As seen from the results shown in FIG. 19, the polyurethane resin for forming the base film tends to have lower peel strength and thus have higher handling suitability with increase in the content of the second polyurethane resin having a glass transition temperature relative higher than the first polyurethane resin. However, when the content of the second polyurethane resin is too large, which increases the tensile stress at 100% elongation, the polyurethane resin for forming the base film tends to have low adhesion suitability. When the ratio (P2/P1) of the first mass (P1) of the first polyurethane resin to the second mass (P2) of the second polyurethane resin is 1/25 or more and 1/5 or less, both the adhesion suitability and the handling suitability of the examination marker are improved.

As described above, according to the sixth embodiment of the examination marker, the following advantages can be obtained.

(6-1) Since the tensile elongation at break is 130% or more and the tensile stress at 100% elongation is 10 MPa or less, the laminate composed of the base film 11 and the adhesive layer 15 can be stretched to a large extent with a small force. In addition, while the laminate maintains high flexibility since the base film 11 has the peel strength of 3.5 N/25 mm or less, it is possible to separate a portion of the laminate from another portion when they are in contact with each other by applying a force in a direction that separates the contact portions.

(6-2) Since the polyurethane resin includes at least one selected from the group consisting of ether-based polyurethane resin, ester-based polyurethane resin, and carbonate-based polyurethane resin, the base film 11 has high flexibility and thus can be easily adhered to the breast B.

(6-3) Since two polyurethane resins included in the polyurethane resin for forming the base film 11 have different glass transition temperatures, both flexibility and low adhesion can be achieved in the base film 11.

(6-4) Due to a large difference between the glass transition temperature of the first polyurethane resin and the glass transition temperature of the second polyurethane resin, the base film 11 can exhibit both flexibility and low adhesion.

(6-5) Due to the ratio of the second mass to the first mass being 1/25 or more and 1/5 or less, the base film 11 can exhibit tensile elongation at break and tensile stress at 100% elongation enabling high flexibility, and peel strength enabling low adhesion.

(6-6) Since the laminate composed of the base film 11 and the adhesive layer 15 is sandwiched between the separable film 13 and the protective film 14, the laminate is kept clean by these films until the separable film 13 and the protective film 14 are removed from the laminate.

The sixth embodiment described above can be modified and implemented as below.

[Adhesive Layer]

As long as the laminate composed of the base film 11 and the adhesive layer 15 in the examination marker 10 satisfies the above conditions 6-1 to 6-3, the adhesive for forming the adhesive layer 15 may be a resin other than urethane-based adhesive.

[Separable Film]

The separable film 13 may be omitted. In this case as well, advantages similar to the above (6-1) can be obtained as long as the examination marker 10 includes the base film 11 and the adhesive layer 15, and satisfies the conditions 6-1 to 6-3.

[Protective Film]

The protective film 14 may be omitted. In this case as well, advantages similar to the above (6-1) can be obtained as long as the examination marker 10 includes the base film 11 and the adhesive layer 15, and satisfies the conditions 6-1 to 6-3.

[Other Modifications]

The components in the first to sixth embodiments and modifications of the embodiments described above can be implemented in combination with each other as long as no contradiction occurs.

What is claimed is:

1. An examination marker for use in diagnostic imaging using microwaves, comprising:
    a base film made of a polyurethane resin, the base film having a scan index, and
    a gel layer laminated on the base film, wherein
    the gel layer is made of an aliphatic hydrocarbon that has a higher transmissivity to microwaves than water does, and has shear viscosity at 30° C. of 5,000 mPa·s or more and 50,000 mPa·s or less,
    the base film has a tensile elongation at break of 130% or more, and a tensile strength at 100% elongation of 4 N/cm or less,
    the base film has a thickness of 5 μm or more and 15 μm or less; and
    the examination marker is configured to adhere to a human breast without wrinkles, while covering the breast entirely.

2. The examination marker of claim 1, wherein
the polyurethane resin includes at least one selected from the group consisting of ether-based polyurethane resin and ester-based polyurethane resin.

* * * * *